(12) United States Patent
Coles et al.

(10) Patent No.: US 11,827,109 B2
(45) Date of Patent: Nov. 28, 2023

(54) SYSTEM FOR DELIVERING AND STORING ENERGY

(71) Applicant: RICARDO UK LIMITED, Shoreham by Sea (GB)

(72) Inventors: Raymond Coles, Shoreham by Sea (GB); Ozge Taskin, Shoreham by Sea (GB)

(73) Assignee: Ricardo UK Limited, Sussex (GB)

( * ) Notice: Subject to any disclaimer, the term of this patent is extended or adjusted under 35 U.S.C. 154(b) by 0 days.

(21) Appl. No.: 17/608,389

(22) PCT Filed: Mar. 19, 2020

(86) PCT No.: PCT/GB2020/050724
§ 371 (c)(1),
(2) Date: Nov. 2, 2021

(87) PCT Pub. No.: WO2020/221985
PCT Pub. Date: Nov. 5, 2020

(65) Prior Publication Data
US 2022/0242254 A1 Aug. 4, 2022

(30) Foreign Application Priority Data

May 2, 2019 (GB) ..................................... 1906215

(51) Int. Cl.
*H02P 1/46* (2006.01)
*B60L 50/61* (2019.01)
(Continued)

(52) U.S. Cl.
CPC ............ *B60L 50/61* (2019.02); *H02K 1/2773* (2013.01); *H02K 7/006* (2013.01); *H02K 7/025* (2013.01);
(Continued)

(58) Field of Classification Search
CPC .. B60L 50/61; B60L 2202/14; B60L 2220/18; B60L 2240/421; B60L 2240/423;
(Continued)

(56) References Cited

U.S. PATENT DOCUMENTS

| 3,758,800 A | 9/1973 | McLaughlin |
| 4,110,646 A | 8/1978 | Rao |

(Continued)

FOREIGN PATENT DOCUMENTS

| CN | 104242504 A | 12/2014 |
| CN | 105164895 A | 12/2015 |

(Continued)

*Primary Examiner* — Karen Masih
(74) *Attorney, Agent, or Firm* — Honigman LLP; Eric J. Sosenko; Jonathan P. O'Brien

(57) ABSTRACT

A method of operating an electric or hybrid system comprising a synchronous reluctance electric motor coupled to an electric or hybrid powertrain is described herein. The method comprises determining (i) a torque demand required of the electric motor and (ii) a speed of rotation of the rotor of the electric motor, and storing kinetic energy in a rotor of the electric motor from the powertrain in response to at least one of (i) the determined torque demand falling below a selected torque demand threshold and (ii) the speed of the rotor being below a selected rotor speed threshold. The method further comprises operating the electric motor by powering the electric motor with electricity to deliver energy to the powertrain in response to at least one of: (i) the determined torque demand rising above a selected torque demand threshold and (ii) the speed of the rotor falling below a selected rotor speed threshold.

19 Claims, 11 Drawing Sheets

(51) Int. Cl.
  *H02P 23/30*  (2016.01)
  *H02P 25/08*  (2016.01)
  *H02K 1/276*  (2022.01)
  *H02K 7/00*   (2006.01)
  *H02K 7/02*   (2006.01)
  *H02P 101/45* (2016.01)
  *H02P 103/20* (2016.01)

(52) U.S. Cl.
  CPC .......... *H02P 23/30* (2016.02); *H02P 25/0805* (2016.02); *B60L 2220/14* (2013.01); *B60L 2220/18* (2013.01); *B60L 2240/421* (2013.01); *B60L 2240/423* (2013.01); *B60L 2240/443* (2013.01); *H02P 2101/45* (2015.01); *H02P 2103/20* (2015.01)

(58) Field of Classification Search
  CPC .......... B60L 2240/443; H02P 2101/45; H02P 2103/20; H02P 23/30; H02P 25/0805; H02P 25/08; H02P 9/06; H02K 1/2773; H02K 7/006; H02K 7/025
  See application file for complete search history.

(56) References Cited

U.S. PATENT DOCUMENTS

| | | | |
|---|---|---|---|
| 5,296,773 A | 3/1994 | El-Antably et al. | |
| 5,831,367 A | 11/1998 | Fei et al. | |
| 2005/0007061 A1 | 1/2005 | Hofmann et al. | |
| 2012/0197472 A1 | 8/2012 | He et al. | |
| 2012/0309575 A1 | 12/2012 | Buffet | |
| 2014/0203760 A1 | 7/2014 | Lammers et al. | |
| 2015/0171673 A1 | 6/2015 | Cioffi et al. | |
| 2015/0171674 A1 | 6/2015 | Lee et al. | |
| 2017/0063183 A1 | 3/2017 | Shrestha et al. | |
| 2017/0222520 A1 | 8/2017 | Repentin | |
| 2017/0310171 A1 | 10/2017 | Reddy et al. | |
| 2017/0341504 A1 | 11/2017 | Dorsett et al. | |
| 2018/0013338 A1 | 1/2018 | Gassmann | |
| 2018/0083500 A1 | 3/2018 | Buttner et al. | |
| 2022/0032903 A1* | 2/2022 | Thompson | B60W 20/40 |

FOREIGN PATENT DOCUMENTS

| | | |
|---|---|---|
| DE | 102013208856 A1 | 11/2014 |
| EP | 2706038 A1 | 3/2014 |
| GB | 1328436 A | 8/1973 |
| JP | 2003333813 A | 11/2003 |
| JP | 2004048859 A | 2/2004 |
| JP | 2018170814 A | 11/2018 |
| WO | 96/42132 A1 | 12/1996 |
| WO | 2015/041483 A1 | 3/2015 |
| WO | 2015/146385 A1 | 10/2015 |
| WO | 2018/074561 A1 | 4/2018 |

* cited by examiner

SYSTEM FOR DELIVERING AND STORING ENERGY

FIELD OF THE INVENTION

The present disclosure relates to electric machines, in particular, a system and method of operating a system for delivering and storing energy from an electric or hybrid powertrain, and to a synchronous reluctance motor for use with such a system, and a method of manufacture of the synchronous reluctance motor.

BACKGROUND

Pressure to minimise the life-cycle cost of ownership and the life-cycle impact on the environment and health together mean that the choice of materials and energy consumption are key considerations in the manufacture and operation of mechatronic systems such as vehicles. In the realm of personal mobility this has seen the rise of hybrid vehicles.

As regulator and user demand for environmentally friendly vehicles grows and the regulations on carbon emissions become ever stricter, hybrid vehicles are becoming more popular. As will be known to the skilled reader, hybrid vehicles use a combination of two or more different power sources to move a vehicle or otherwise power machinery. In the field of motor vehicles, the most common hybrid is a hybrid electric vehicle (HEV) which combines an internal combustion engine (ICE) with one or more electric motors. Depending on the power demand at any given time, one or both of the ICE and the electric motor will be deployed to provide power to the vehicle's outputs.

As the rotor of an electric machine rotates, under constant boundary conditions the energy stored in the air gap changes. When being driven the rate of change of this energy thus defines the power delivered by the machine. The power (P) delivered by a machine is therefore related to the absolute change in energy between the maximum and minimum values, which defines the torque (T) delivered, and the rate of change between those two values, which is defined by the rotational speed (ω). In other words, the rate of change of this energy thus defines the torque, (T), the machine can deliver. The power, (P), delivered by the machine is therefore related to the rotational speed (w) at which this torque is delivered (see Equation 1 below).

$$P = T \cdot \omega \quad (1)$$

The conventional approach to designing power dense electric motors, for applications such as automobiles, is to design the motor so as to increase the flux density in the gap to be as great as possible. This is why permanent magnetic materials are classically used to drive up the gap flux density (ß) as the air gap energy density is a function of ß² (See Equation 2 below). A drawback with a high flux density, however, is that large changes in magnetic flux result in large losses—particularly in the form of heat—from eddy currents and hysteresis in the stator teeth.

$$E = \frac{\beta^2 \cdot vol}{2 \cdot \mu_0} \quad (2)$$

As described previously, machine power delivered can be increased by increasing either torque or speed. Increasing torque means greater air gap flux density as discussed. The alternative then is to increase the speed. By increasing the speed the number of coil activations per unit time, will increase. Running a motor at higher speeds is generally more efficient, if the back emf can be accommodated, as for a given power the required torque falls with speed. The current falls with torque and resistive losses reduce with the square of the fall in current. However, as the speed increases so too does the reactance associated with the windings' inductance. Where:

$$XL = 2 \cdot \pi \cdot f \cdot L \quad (3)$$

where f is the frequency in hertz of the signal and L is the winding inductance. This increased reactance increases the voltage drop across the windings limiting the ability of the current to enter the stator windings. As a consequence, the number of turns in the windings needs to be reduced, which increases the current or the voltage needs to be increased.

Problems exist with known hybrid systems since such systems may be subjected to high cycling frequency and associated high power flows and heat generation caused by, for example, regenerative braking and recovery, which may accelerate the deterioration of battery health, thereby limiting the system life. In addition, if such systems are placed under repeated charge/discharge cycles with little or no chance for thermal relaxation (i.e. for thermal diffusion), this problem can be exacerbated. Therefore, energy is required to cool the system that could otherwise be used to propel the vehicle; thereby limiting range or requiring a greater battery.

Aspects of the disclosure seek to address these problems.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In the present case the inventors have recognised that by operating at higher rotational speeds and voltages, the motor may be operating primarily in the skin depth region at reduced current. As a result, materials with a higher resistance may be used and/or the motor may be operated at higher temperatures as the effect of the higher resistance and/or temperature is nullified by the skin effect. As a result, a (cheaper) material with a higher resistivity may be used without adversely affecting the efficiency of the electric motor.

Furthermore, based on the equation relating power, torque and rotational speed described above, if an electric motor is operated at higher speeds, for the same power output the torque is reduced. The torque is proportional to the current passing through the stator windings and as such operating the electric motor at higher speeds may reduce the current. Reducing the current can reduce I²R losses and therefore result in the electric motor operating more efficiently. In addition, if the current can be reduced then (again) a (cheaper) material with a higher resistance may be used without adversely affecting the efficiency of the electric motor.

The inventors have also recognised that by using an electric motor, for example in an HEV, with no permanent field component, for example with a rotor containing no permanent magnets, such as a synchronous reluctance or inductance motor, the rotor of the motor itself can be used as a flywheel to store energy in the form of rotational kinetic energy, thereby recovering energy that may otherwise be lost, for example, as heat. If, otherwise, the kinetic energy were absorbed into the battery (via a conversion of the kinetic energy into electrical energy and then via a conversion of the electrical energy into chemical energy) then the power electronics and battery (which are managing the associated power/current flow) would be heated which could be damaging to these components over time if these components are not given sufficient time to cool down and if there is a not a sufficient thermal gradient to permit cooling. In addition, because energy is stored in the form of rotational kinetic energy (whereas before the energy would be absorbed by the battery) instead the thermal stress has time to dissipate as heat has time to diffuse away. This in turn acts to effectively increase the active surface area for heat transfer.

Accordingly in a first aspect of the disclosure there is provided a system for delivering energy to, and storing energy from, an electric or hybrid powertrain, the system comprising:

a synchronous reluctance electric motor couplable to the powertrain; and a controller configured to control operation of the synchronous reluctance electric motor to store energy received from the powertrain in the rotor of the synchronous reluctance electric motor as kinetic energy.

The controller may be configured to control operation of the synchronous reluctance electric motor to deliver energy to the powertrain by using kinetic energy stored in the rotor. For example, the controller may be configured to determine a torque demand required of the system and control operation of the motor to deliver energy to the powertrain using kinetic energy stored in the rotor in response to the determined torque demand reaching a selected torque demand threshold.

The controller may be configured to determine a torque demand based on a sensor coupled to the controller. For example, the controller may be configured to receive sensor signals indicative of a level of torque demanded from the system, for example from the electric motor. For example, the controller may be configured to receive sensor signals from a sensor coupled to a gas/accelerator pedal (and/or any other means for providing an indication of desired torque demand), for example operated by a user of an HEV. In some examples the controller may be configured to determine the torque demand of the system and determine the torque to be delivered to meet that demand using the electric motor and optionally another power source, such as an ICE. The controller may be configured to determine the torque to be delivered using the electric motor based on a determination of the state of charge of a battery coupled to the electric motor and/or the amount of kinetic energy stored in the flywheel.

In some examples the controller is configured to measure the torque demand as a function of time to determine a rate of change of torque demand. The controller may be configured to determine a rate of change of torque demand required of the system and control operation of the motor to deliver energy to the powertrain using one of:

(i) kinetic energy stored in the rotor; or (ii) electricity powering the synchronous reluctance electric motor;

in response to the determined rate of change of torque demand reaching a selected rate of change of torque demand threshold.

In some examples the controller may be configured to determine the ratio of energy to be delivered to the powertrain from the kinetic energy stored in the rotor and electricity powering the synchronous reluctance motor based on the determined torque demand and/or the determined rate of change of torque demand. For example, if the rate of change of torque demand is particularly high, the controller may be configured to use predominantly the kinetic energy stored in the rotor to achieve maximum acceleration, whereas if the rate of change of torque demand is low, the controller may be configured to predominantly use electricity to power the synchronous reluctance electric motor.

In some examples where the system comprises another power source such as an ICE, the controller may be configured to determine whether to use (i) kinetic energy stored in the rotor; and/or (ii) electricity powering the synchronous reluctance electric motor; and/or (iii) the other power source (such as an ICE) as the primary power source for powering the system based on the determined torque demand and/or the rate of change of torque demand. In some examples the controller may be configured to control the ratio of energy delivered to the powertrain from a power source (i.e. the electric motor or the ICE) based on the determined torque demand and/or the rate of change of torque demand. For example, if the determined torque demand exceeds a selected threshold, the controller may be configured to use the other power source as the primary power source to drive the powertrain, but if the rate of change of torque demand exceeds a selected threshold, the controller may be configured to use the kinetic energy stored in the rotor as the primary power source to achieve maximum acceleration. It will be understood that in some examples the controller may also be configured to make the above determinations based on the speed of the rotor; if the speed of the rotor is too low (for example below a selected threshold) the controller will determine that the rotor may not store sufficient kinetic energy to be capable of acting as a power source for powering the powertrain and instead will have to decide whether to supply energy to the powertrain via electricity powering the electric motor or from the other power source (such as an ICE).

In some examples the controller is configured to determine a torque demand required of the system and control operation of the motor to store kinetic energy in the rotor of the electric motor from the powertrain in response to the torque demand falling below a selected torque demand threshold. For example, if the system is used in a vehicle that is braking, the controller will determine that the torque demand has fallen and control the system to recover kinetic energy by spinning up the rotor of the electric motor to act as a flywheel to store the recovered kinetic energy. As well as preventing the unnecessary generation of heat (which can damage the power electronics and/or battery as discussed above), by recovering this energy as kinetic energy rather than converting it into electrical energy to then be used to rapidly charge, for example, a battery (by converting the electrical energy into electro-chemical energy) this may help to prevent the battery and/or power electronics being unnecessarily heated due to the associated high power flows and associated inefficient conversions from one energy form to another.

In some examples the controller is configured to determine, based on a speed of rotation of the rotor and/or a determined torque demand of the system, whether to operate the system in at least one of:

(i) a first mode of operation operable to deliver energy to the powertrain by powering the motor via electricity;

(ii) a second mode of operation operable to deliver energy to the powertrain by using kinetic energy stored in the rotor; and (iii) a third mode of operation operable to store energy received from the powertrain as kinetic energy; and (iv) a fourth mode of operation operable to convert kinetic energy in the rotor to electrical energy.

Converting kinetic energy in the rotor to electrical energy may comprise the controller controlling the electric motor to act as a generator, or may comprise the controller controlling the system to use the kinetic energy in the rotor to drive a separate generator to create electricity. The electrical energy created may be supplied to a battery coupled to the electric motor (for example if used in an HEV), or it may be supplied to an electrical grid coupled to the battery (for example if used in some trains/locomotives). In this way, the supply of electrical energy fed back to the battery and/or the grid can be controlled, which can reduce high current peaks and transients, thus preserving the life of electrical components and batteries. This may be a particularly relevant problem when considering frequent stop-start journeys, such as those made by couriers or public transport (e.g. busses, trains, tubes etc.).

In some examples the controller may be configured to operate the system in a fifth mode of operation. In the fifth mode of operation the system may be idle where no energy is being delivered to and/or from the powertrain (for example, the vehicle is on but waiting at traffic lights), for example when there is no determined torque demand and when the rotor is spinning at a speed above a selected threshold. In some examples the fifth mode of operation may comprise auxiliary systems (such as heating, ventilation and air conditioning, HVAC) being powered by kinetic energy stored in the rotor. In some examples, in the fifth mode of operation, if there is another power source (such as an ICE), the controller may be configured to determine to power off the other power source to increase efficiency and reduce emissions.

In some examples the controller may also be configured to operate the system in a sixth mode of operation. The sixth mode of operation may start at "key-on", for example when the vehicle is started from cold. For example, the controller may be configured to operate the controller in a sixth mode of operation after the system has been stationary and/or switched off for a selected off time interval. As such, the sixth mode of operation may start with the rotor being idle and cold. The controller may take advantage of the fact that the rotor is cold and use this fact to spin the rotor up to high speeds (for example, to at least 8,000 rpm, or to a flywheel mode with speeds of at least 18,000 rpm) in a short space of time. Because the rotor is cold, the controller can operate the electric motor in an "overdrive mode" for a selected time interval and/or until the rotor has reached a selected rotation speed. By spinning the rotor up quickly for a selected time interval in this manner the controller may avoid operating the system in regimes where the rotor is running at a low speed and with high torque. The controller may be configured to exit the sixth mode of operation once the rotor has reached a selected rotation speed.

The controller may be configured to operate the system in the fourth mode in response to at least one of (i) the speed of the rotor reaching a selected maximum speed threshold and (ii) the determined torque demand remaining below a minimum torque demand threshold for greater than a selected time interval. For example, if the rotor is already spinning at maximum, or close to maximum speed, the controller may be configured to determine that the kinetic energy stored in the rotor should be converted into electrical energy so as to create capacity in the rotor to store more kinetic energy again. The maximum speed threshold may be selected based on design tolerances of the rotor and/or the maximum centripetal force that the rotor can withstand.

In some examples, for example when used in an HEV, the system further comprises a battery coupled to the electric motor. In such examples the controller may be configured to operate the system in the fourth mode to control the flow of energy from the electric motor to the battery based on: (i) the state of charge of the battery, (ii) the speed of the rotor and optionally (iii) a torque demand required of the electric motor. For example, the controller may be configured to only operate in the fourth mode to charge the battery if there is no torque demand placed on system e.g. if parked or at "key-off" (when the system is switched off). However it will be understood that this feature is optional as there may be a secondary power source (such as an ICE) which could power the vehicle, so the battery may still be charged even if there is a torque demand so long as the torque demand is met by the secondary power source (in this case the ICE).

In some examples the controller is configured to operate the system in the first mode when the speed of the rotor is below a selected rotor speed threshold. The controller may be configured to operate the system in the second mode when the speed of the rotor is above a selected rotor speed threshold. The controller may be configured to operate the system in the first mode in response to the determined torque demand reaching or exceeding a selected torque demand threshold (for example if the determined torque demand is greater than the amount of energy stored as kinetic energy in the rotor), and in the second mode in response to the determined torque demand falling below a selected torque demand threshold. The controller may be configured to operate the system in the third mode in response to a torque demand of the system falling below a selected threshold—for example the controller may be configured to operate the system in the third mode in response to the torque demand being zero, or less than zero (i.e. the user wants to slow down). In some examples the controller is configured to operate the system in the third mode in response to a rate of torque demand indicating a deceleration exceeding a selected rate of deceleration threshold.

In some examples in the third mode the controller is configured to operate the system to speed the rotor up from a speed the rotor operates at when the motor is powered by electricity to a flywheel speed for storing energy in the form of kinetic energy. In other words, the controller may be configured to operate the electric motor in a "motor mode" and a "flywheel mode". In the motor mode the controller may be configured to keep the rotor rotating at speeds of at least 8000 rpm, for example between 8000 rpm and 14,000 rpm, such that it avoids operating the system in regimes where the rotor is running at a low speed and with high torque. In the flywheel mode the rotor will spin at much higher speeds, for example, at speeds of at least 10,000 rpm, for example at least 14,000 rpm, and in some examples in excess of 20,000 rpm, for example up to 40,000 rpm. It will be understood that there may be a "blended region" where the controller can operate the electric motor in either the motor mode or the flywheel mode, for example the controller may be configured to operate the electric motor in a blended region comprising at least a portion of the speeds for the motor mode and at least a portion of the speeds for the flywheel mode, for example the controller may be configured to operate the electric motor in a blended region where the rotor rotates at speeds of between 10,000 rpm and 14,000 rpm.

In some examples the system comprises a variable transmission such as an infinitely variable transmission, coupled between the powertrain and the rotor, and wherein the controller being configured to control operation of the motor to operate the system to speed the rotor up comprises the controller being configured to control the operation of the variable transmission to control the supply of energy between the powertrain and the rotor. In this way the controller may use the variable transmission to convert kinetic energy in the power train into kinetic energy stored in the rotor. Directly converting mechanical energy in this way may be more efficient than converting the mechanical energy in the powertrain into electrical energy and then using the electrical energy to power a motor to spin up a flywheel, as there are inevitably losses when converting mechanical energy to electrical energy and vice-versa.

It will be understood that a variable transmission is one that can change through a range of effective gear ratios, and includes a continuously variable transmission (CVT) or an infinitely variable transmission (IVT). In an IVT the range of ratios of output shaft speed to input shaft speed includes a zero ratio that can be continuously approached from a defined "higher" ratio. The variable transmission may be controlled by the controller, for example, to allow the motor to turn at the RPM at which it produces greatest power or operates most efficiently. It will be understood that in some examples the variable transmission may comprise a clutch (such as a centrifugal clutch) to facilitate a neutral stance and/or may comprise a multi-speed (for example two speed) gear box to extend the efficient range of the machine. In some examples the variable transmission may be replaced by a clutch and/or multi-speed gearbox.

Another aspect of the disclosure provides a hybrid electric vehicle, HEV, comprising the system for delivering energy described above.

In another aspect of the disclosure there is provided a method of operating an electric or hybrid system comprising a synchronous reluctance electric motor coupled to an electric or hybrid powertrain, the method comprising:
  determining (i) a torque demand required of the electric motor and (ii) a speed of rotation of the rotor of the electric motor;
  storing kinetic energy in a rotor of the electric motor from the powertrain in response to at least one of (i) the determined torque demand falling below a selected torque demand threshold and (ii) the speed of the rotor being below a selected rotor speed threshold; and
  operating the electric motor by powering the electric motor with electricity to deliver energy to the powertrain in response to at least one of: (i) the determined torque demand rising above a selected torque demand threshold and (ii) the speed of the rotor falling below a selected rotor speed threshold.

In some examples the method further comprises powering the electric motor with electricity to deliver energy to the powertrain in response to both (i) the torque demand rising above a selected torque demand threshold, and (ii) the speed of the rotor of the electric motor falling below a selected rotor speed threshold.

The method may further comprise operating the system to deliver energy to the powertrain by using kinetic energy stored in the rotor when the speed of the rotor is above a selected speed threshold. In some examples the method further comprises operating the system to convert kinetic energy in the rotor to electrical energy in response to at least one of (i) the speed of the rotor reaching a selected maximum speed threshold and (ii) the determined torque demand remaining below a selected minimum torque demand threshold for greater than a selected time interval.

In some examples the method further comprises determining a rate of change of torque demand required of the system and controlling operation of the motor to deliver energy to the powertrain using one of:
  (i) kinetic energy stored in the rotor; or
  (ii) electricity powering the synchronous reluctance electric motor;
in response to the determined rate of change of torque demand reaching a selected rate of change of torque demand threshold.

In another aspect of the disclosure there is provided a computer readable non-transitory storage medium comprising a program for a computer configured to cause a processor to perform the method described above.

In another aspect of the disclosure there is provided a rotor for a synchronous reluctance electric motor comprising no permanent magnets and a plurality of magnetic flux guides supported by a flux guide support, wherein the plurality of magnetic flux guides are configured to preferentially guide the flow of magnetic flux therethrough. It will be understood that the rotor, and the synchronous reluctance motor in which it is used, may be part of the system for delivering energy described above with respect to the first aspect.

The flux guides may be made of a high permeability magnetic material, such as electrical steel, nickel or a press-sintered material, for example a soft magnetic composite such as Somaloy® (with the Somaloy® being of a resistance where lamination would not be required, such as Somaloy® 500, Somaloy® 130i, Somaloy® 700 3P or Somaloy® 700 5P). The flux guide support may be any of: (i) a ring for bounding the rotor; (ii) a fastening means such as rivets holding packet of flux guides together; and/or (iii) a receiving portion of a cast for holding the magnetic flux guides in place. The flux guide support may be non-magnetic.

Unlike conventional synchronous reluctance electric motors which may comprise flux barriers formed from air or magnetically permeable material, the synchronous reluctance electric motors of the present disclosure use flux guides to actively guide the passage of magnetic flux therethrough. As such, the amount of magnetic material needed in the formation of such rotors can be reduced.

The plurality of magnetic flux guides may comprise a plurality of at least partially nested flux guides formed from layers of magnetic material layered in a radial direction. The layers of magnetic material forming the flux guides may be coupled together to form discrete, laminated, packets of flux guides, with each discrete packet configured, in use, to provide a pole in the rotor. For example, the layers of flux guides may be coupled together by a fastening means, such as rivets or a bracket. The fastening means may be configured to withstand high centripetal forces that may be experiences when the rotor is acting as a flywheel to store kinetic energy. The packets may be spaced around the periphery of the rotor, and the centre of the rotor may be filled with non-magnetic material such as aluminium.

The layers of magnetic material forming the flux guides may be separated by a non-magnetic composite material. The non-magnetic composite material may be a glass composite material. The non-magnetic composite material may act as a fastening means to hold the layers of magnetic flux guides together. The non-magnetic composite material may be the same as or different to the non-magnetic material filling the centre of the rotor.

In some examples the flux guides are configured to provide at least four poles in the rotor. Each of the flux guides may be arcuate with the mid-point of each flux guide being closest to the centre of the rotor and the ends of each flux guide being closest to the edge of the rotor in the radial direction.

In some examples the rotor is bounded by an outer ring of non-magnetic material. The ring may be configured to withstand centripetal forces from the rotor spinning at high speeds, for example at least 40,000 rpm. In some examples the ring is made from Inconel; in other examples the ring may be made from windings such as carbon fibre windings. The ring may have a relative permeability of 1.

In some examples, at least a portion of each flux guide proximate to the periphery of the rotor (for example, the portion of the flux guide adjacent to the ring) is formed from a different material to the rest of the flux guide, for example a soft magnetic composite such as Somaloy® 500 or Somaloy® 700.

The rotor may be configured, in use, to be operated at temperatures of at least 300° C. The rotor may be configured to be operated as a flywheel to store kinetic energy. For example, the rotor may be configured to spin at speeds of at least 40,000 rpm.

In another aspect of the disclosure there is provided a synchronous reluctance motor comprising a stator and the rotor of the aspect described above. The stator may comprise aluminium windings. The aluminium windings of the stator may be joined via a weld with a bimetallic joint. The stator may comprise a plurality of teeth around which the aluminium windings are formed, and wherein each tooth is tapered such that a portion of the tooth closer to the rotor is narrower than a portion of the tooth further away from the rotor. In some examples the teeth of the stator form at least 36 slots, for example at least 48 slots. Each tooth of the stator may comprise only one layer of windings and at least 8 turns in the windings. In some examples the synchronous reluctance motor further comprises a cooling means surrounding the stator. The cooling means may comprise a liquid-filled jacket. In some examples the synchronous reluctance motor further comprises a layer of aluminium sandwiching either side of the rotor and stator along the axis of rotation of the rotor, wherein the layers of aluminium are configured to provide a squirrel cage for the motor.

In another aspect of the disclosure there is provided a method of manufacture of a rotor for a synchronous reluctance motor, the method comprising:
providing a cast for receiving components of the rotor;
providing a plurality of magnetic flux guides configured to preferentially guide the flow of magnetic flux therethrough;
inserting the plurality of magnetic flux guides in groups inside the cast, wherein the groups are spread in a circular pattern around the cast, thereby creating a void in the middle of the rotor;
filling the void in the middle of the rotor with a non-magnetic material.

The non-magnetic material may be aluminium.

In some examples the cast for receiving components of the rotor comprises a ring configured to encircle the rotor arounds its circumference and wherein the ring is configured to hold the components of the rotor therewithin. In some examples the cast comprises a plurality of receiving portions configured to receive and position the flux guides within the rotor.

In another aspect of the disclosure there is provided a method of manufacture of a rotor for a synchronous reluctance motor, the method comprising:
providing a plurality of magnetic flux guides configured to preferentially guide the flow of magnetic flux therethrough;
coupling the plurality of magnetic flux guides into groups with a flux guide support, wherein the groups are configured to be spread around the periphery of the inside of the rotor.

In some examples coupling the plurality of flux guides into groups with the flux guide support comprises creating sandwiched layers of flux guides supports, wherein the sandwiched layers comprise layers of non-magnetic composite sandwiched between layers of magnetic flux guide.

In some examples coupling the plurality of flux guides into groups with the flux guide support comprises coupling layers of flux guides together to form a plurality of discrete packets of magnetic flux guides, wherein each packet comprises a plurality of layers of magnetic flux guides.

In some examples coupling layers of flux guides together comprises fastening layers of flux guides together with a fastening means that passes at least partially through the layers of flux guides to fasten the layers of flux guides together.

In another aspect of the disclosure there is provided a method of manufacture of a rotor for a synchronous reluctance motor, the method comprising:
providing a plurality of magnetic flux guides configured to preferentially guide the flow of magnetic flux therethrough;
providing a flux guide support for supporting the plurality of magnetic flux guides;
placing the plurality of magnetic flux guides in groups on the magnetic flux guide support, wherein each group comprises a plurality of layered magnetic flux guides forming a packet of magnetic flux guides;
filling the space between each layer of each group forming a packet with a non-magnetic composite material to form sandwiched layers of non-magnetic composite sandwiched between layers of magnetic flux guide.

In some examples placing the plurality of magnetic flux guides in groups, each group forming a packet, on the magnetic flux guide support comprises placing the packets of magnetic flux guides in a circular pattern around the support, further comprising coupling the magnetic flux guides of each packet together by filling a void between each packet of magnetic flux guides with a non-magnetic material.

In another aspect of the disclosure there is provided method of manufacture of a stator for a synchronous reluctance motor, the method comprising:
providing an elongate strip of magnetic material;
forming a plurality of slots along one edge of the elongate strip, thereby forming a plurality of stator teeth for receiving stator windings along the edge of the elongate strip, wherein the depth of the slots are selected such that the depth of material of the elongate strip between the bottom of each slot and an opposing edge of the elongate strip is sufficient to allow the elongate strip to bend sufficiently such that two ends of the elongate strip may be joined together; and
connecting two opposing ends of the elongate strip together into a ring such that the edge of the elongate strip comprising the plurality of slots face towards the inside of the ring.

In some examples forming the plurality of slots comprises forming a plurality of tapered slots to thereby form a plurality of a tapered teeth, the degree of tapering selected based on the length of the elongate strip such that when the two opposing ends of the elongate strip are connected together into a ring the spacing between the plurality of the tapered teeth along a depth of the slot is uniform.

DRAWINGS

Embodiments of the disclosure will now be described, by way of example only, with reference to the accompanying drawings, in which.

SPECIFIC DESCRIPTION

Embodiments of the claims relate to a system for delivering energy to, and storing energy from, an electric or hybrid powertrain. In particular, embodiments of the claims relate to a system that may be used, for example, in a hybrid or electric powertrain to recover kinetic energy (for example when braking) but that can control the supply of recovered electrical energy fed back to a battery and/or a power transmission network (such as the National Grid). As a result, the system can help to reduce high current peaks and transients, thus preserving the life of electrical components and batteries.

Figure 1:
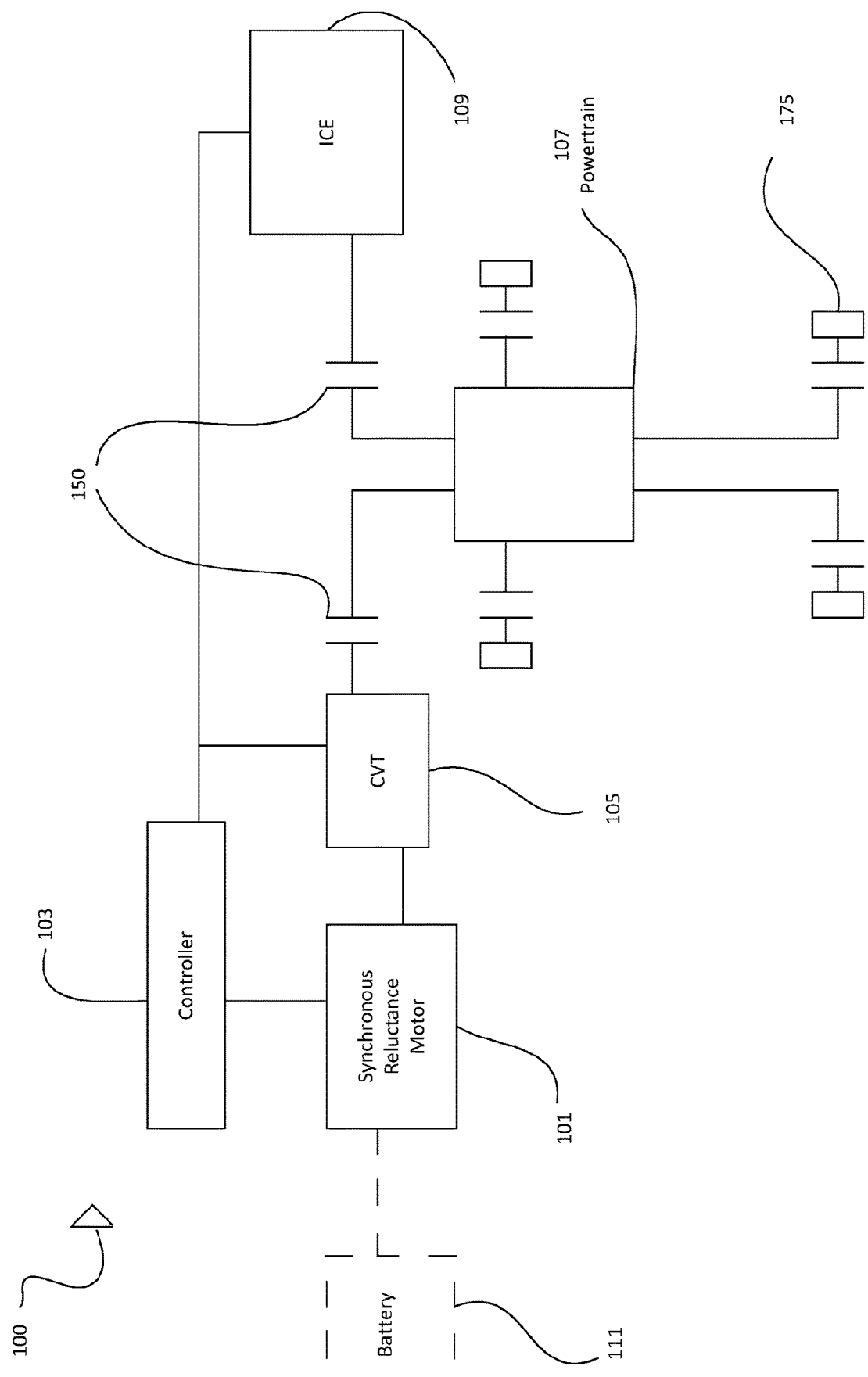
FIG. 1 shows a functional block diagram of example system for delivering energy to, and storing energy from, an electric or hybrid powertrain.

FIG. 1 shows a functional block diagram of example system 100 for delivering energy to, and storing energy from, an electric or hybrid powertrain. FIG. 1 shows a synchronous reluctance electric motor 101 coupled to powertrain 107 via a variable transmission 105. It will be understood that the variable transmission 105 may be one that can change through a range of effective gear ratios, and could include a continuously variable transmission (CVT) and/or an infinitely variable transmission (IVT).

A secondary power source 109, which in this example is an internal combustion engine, is also coupled to the powertrain 107 in parallel to the synchronous reluctance motor 101. It will be appreciated that the secondary power source 109 may also be coupled to the powertrain 107 via a variable transmission (not shown) or may share a variable transmission with the electric motor 101. Between each of the variable transmission 105, and the secondary power source 109 is a clutch 150.

A controller 103 is coupled to the synchronous reluctance electric motor 101, the variable transmission 105 and the secondary power source 109, although it will be understood that the controller 103 may only be coupled to the synchronous reluctance motor 101 and in some examples also the variable transmission 105. In the example shown, the powertrain 107 is a powertrain of a hybrid electric vehicle, and as such the powertrain 107 is coupled to four respective wheels 175. In the example shown each wheel 175 is coupled to the powertrain 107 via a respective optional clutch 150.

In the example shown in FIG. 1 the synchronous reluctance electric motor 101 is also coupled to an optional battery 111.

The controller 103 is configured to control operation of the synchronous reluctance electric motor 101 to store energy received from the powertrain 107 in the rotor of the synchronous reluctance electric motor 101 as kinetic energy. The controller 103 is also configured to control operation of the synchronous reluctance electric motor 101 to deliver energy to the powertrain 107 by using kinetic energy stored in the rotor.

In the example shown in FIG. 1 the controller 103 is configured to determine a torque demand required of the system and control operation of the motor 101 to deliver energy to the powertrain 107 using kinetic energy stored in the rotor in response to the determined torque demand reaching a selected torque demand threshold. The selected torque demand threshold may be selected based on a power output of the secondary power source 109, for example a peak power output of the secondary power source 109. Additionally or alternatively, the selected torque demand threshold may be selected based on a capacity or power rating of the optional battery 111—for example the selected torque demand threshold may be selected so that the optional battery 111 is not subjected to extreme discharge scenarios.

In the example shown in FIG. 1 the controller 103 is configured to determine a torque demand based on a sensor coupled to the controller 103. In the example shown in FIG. 1 the controller 103 is configured to receive sensor signals indicative of a level of torque demanded from the system, for example from the electric motor 101. For example, the controller 103 may be configured to receive sensor signals from a gas pedal operated by a user of an HEV.

In the example shown in FIG. 1 the controller 103 is configured to determine the torque demand of the system and determine the torque to be delivered to meet that demand using the electric motor 101 and optionally the secondary power source 109. In the example shown in FIG. 1 the controller 103 is configured to determine the torque to be delivered using the electric motor 101 based on a determination of the state of charge of the optional battery 111 coupled to the electric motor 101 and/or the amount of kinetic energy stored in the rotor of the electric motor 101 (which can be determined from the speed of rotation of the rotor), for example so that the torque demand can be met using a combination of the kinetic energy stored in the rotor of the electric motor 101 and/or energy from the secondary power source 109.

In the example shown in FIG. 1 the controller 103 is configured to determine, based on a speed of rotation of the rotor and/or a determined torque demand of the system, whether to operate the system in at least one of: (i) a first mode of operation operable to deliver energy to the powertrain 107 by powering the motor 101 via electricity; (ii) a second mode of operation operable to deliver energy to the powertrain 107 by using kinetic energy stored in the rotor; (iii) a third mode of operation operable to store energy received from the powertrain 107 as kinetic energy; and (iv) a fourth mode of operation operable to convert kinetic energy in the rotor to electrical energy.

Converting kinetic energy in the rotor to electrical energy may comprise the controller 103 controlling the electric motor to act as a generator, or may comprise the controller 103 controlling the system to use the kinetic energy in the rotor to drive a separate generator to create electricity. The electrical energy created may be supplied to a battery 111 coupled to the electric motor 101 (for example if used in an HEV), or it may be supplied to an electrical grid coupled to the battery (for example if used in some trains/locomotives). In this way, the supply of electrical energy fed back to the battery 111 and/or the grid can be controlled, which can reduce high current peaks and transients, thus preserving the life of electrical components and batteries. This may be a particularly relevant problem when considering frequent stop-start journeys, such as those made by couriers or public transport (e.g. busses, trains, tubes etc.).

Figure 4:
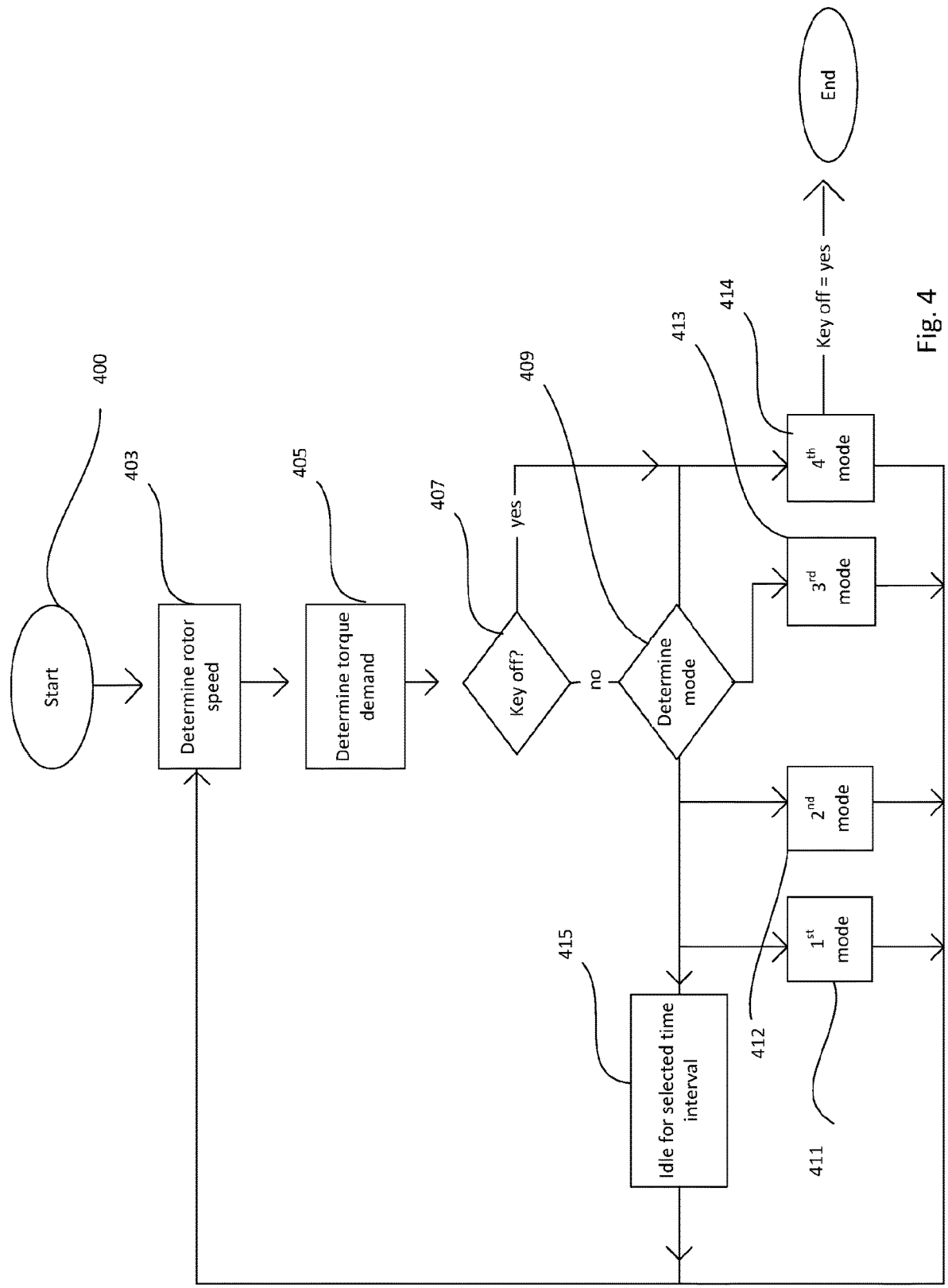
FIG. 4 shows a flow chart of an example method of operating a system for delivering energy to, and storing energy from, an electric or hybrid powertrain, such as the system shown in any of FIGS. 1 to 3.

FIG. 4 shows a flow chart of an example method 400 of operating a system for delivering energy to, and storing energy from, an electric or hybrid powertrain, such as the system shown in FIG. 1

In use, the controller 103 receives sensor signals indicative of the speed of rotation of the rotor for determining 403 the amount of kinetic energy stored in the rotor. The controller 103 also receives sensor signals indicative of a level of torque demanded from the system and determines 405 the torque demand. The controller 103 also makes a determination as to whether the user still wants the system to be operating—in the example shown in FIG. 4 it does this by determining 407 whether the ignition is still on or off ("key-off").

The controller 103 determines 409, based on the speed of rotation of the rotor and the determined torque demand of the system, whether to operate the system in: (i) a first mode 411 of operation operable to deliver energy to the powertrain 107 by powering the motor 101 via electricity; (ii) a second mode 412 of operation operable to deliver energy to the powertrain 107 by using kinetic energy stored in the rotor; (iii) a third mode 413 of operation operable to store energy received from the powertrain 107 as kinetic energy; and (iv) a fourth mode 414 of operation operable to convert kinetic energy in the rotor to electrical energy.

Once the controller 103 is operating in one of these modes of operation it will periodically make a determination as to whether it is still running in the correct mode of operation; in FIG. 4 it does this by waiting 415 a selected time interval before again repeating the process and making a determination as to whether it is still running in the correct mode of operation.

In examples where the controller 103 determines that there is key-off (i.e. that the user no longer wants the system to be operational), such as the example shown in FIG. 4, the controller 103 will operate the system in the fourth mode of operation to convert stored kinetic energy in the rotor to electrical energy so that energy is conserved as far as possible (as otherwise any kinetic energy stored in the rotor will gradually be lost over time due to frictional losses etc.).

In the example shown in FIG. 1, the controller 103 also receives sensor signals indicative of a state of charge of the optional battery 111. The controller 103 determines the torque to be delivered using the electric motor 101 based on a determination of the state of charge of the optional battery 111 coupled to the electric motor 101 and/or the amount of kinetic energy stored in the rotor of the electric motor 101 (which can be determined based on the speed of rotation of the rotor), so that the torque demand can be met using one of, or a combination of, the kinetic energy stored in the rotor of the electric motor 101 and/or energy from the optional battery 111 powering the electric motor 101.

In the example shown in FIG. 1 the controller 103 also receives sensor signals indicative of the power output of the secondary power source 109 and controls the ratio of energy delivered to the powertrain 107 from the electric motor 101 and the secondary power source 109 based on a combination of the determined torque demand, the power output of the secondary power source 109, the state of charge of the optional battery 111 coupled to the electric motor 101 and the amount of kinetic energy stored in the rotor of the electric motor 101.

In some examples the controller 103 is configured to measure the torque demand as a function of time to determine a rate of change of torque demand. The controller 103 may be configured to determine a rate of change of torque demand required of the system and control operation of the motor 101 to deliver energy to the powertrain 107 using one of: (i) kinetic energy stored in the rotor; or (ii) electricity powering the synchronous reluctance electric motor 101, in response to the determined rate of change of torque demand reaching a selected rate of change of torque demand threshold. The electricity powering the synchronous reluctance electric motor 101 may be supplied by the optional battery 111 and/or from a power transmission network (such as the National Grid).

In some examples where the system comprises the secondary power source 109 such as an ICE (such as in the example shown in FIG. 1), the controller 103 may be configured to determine whether to use (i) kinetic energy stored in the rotor; and/or (ii) electricity powering the synchronous reluctance electric motor 101; and/or (iii) the secondary power source 109 as the primary power source for powering the system based on the determined torque demand and/or the rate of change of torque demand. It will be understood that in some examples the controller 103 may be configured to control the system to use a combination of power sources to provide power to the powertrain 107, and that the controller 103 may be configured to control the ratio of power delivered from a power source to the powertrain 107 to meet a determined torque demand.

In some examples the controller 103 may be configured to control the ratio of energy delivered to the powertrain 107 from a power source (i.e. the electric motor or the ICE) based on the determined torque demand and/or the rate of change of torque demand. For example, if the determined torque demand exceeds a first selected threshold, the controller 103 may be configured to use the secondary power source 109 as the primary power source to drive the powertrain 107, but if the rate of change of torque demand exceeds a second selected threshold, the controller 103 may be configured to use the kinetic energy stored in the rotor as the primary power source to achieve maximum acceleration. It will be understood that in some examples the controller 103 may also be configured to make the above determinations based on the speed of the rotor; if the speed of the rotor is too low (for example below a selected threshold) the controller 103 will determine that the rotor may not store sufficient kinetic energy to be capable of acting as a power source for powering the powertrain 107 and instead will have to decide whether to supply energy to the powertrain 107 via electricity powering the electric motor 101 or from the secondary power source 109.

In some examples the controller 103 is configured to determine a torque demand required of the system and control operation of the motor 101 to store kinetic energy in the rotor of the electric motor 101 from the powertrain 107 in response to the torque demand falling below a selected torque demand threshold. For example, if the system is used in a vehicle that is braking, the controller 103 will determine that the torque demand has fallen and control the system to recover kinetic energy (that may otherwise be lost as heat) by spinning up the rotor of the electric motor 101 to act as a flywheel to store the recovered kinetic energy.

In some examples the controller 103 may be configured to determine the ratio of energy to be delivered to the powertrain from the kinetic energy stored in the rotor and electricity powering the synchronous reluctance motor 101 based on the determined torque demand and/or the determined rate of change of torque demand. For example, if the rate of change of torque demand is particularly high, the controller 103 may be configured to use predominantly the kinetic energy stored in the rotor to achieve maximum acceleration, whereas if the rate of change of torque demand is low, the controller 103 may be configured to predominantly use electricity to power the synchronous reluctance electric motor 101.

In some examples the controller 103 is configured to operate the system in the first mode when the speed of the rotor is below a selected rotor speed threshold. The controller 103 may be configured to operate the system in the second mode when the speed of the rotor is above a selected rotor speed threshold. The controller 103 may be configured to operate the system in the first mode in response to the determined torque demand reaching or exceeding a selected torque demand threshold (for example if the determined torque demand is greater than the amount of energy stored as kinetic energy in the rotor), and in the second mode in response to the determined torque demand falling below a selected torque demand threshold. The controller 103 may be configured to operate the system in the third mode in response to a torque demand of the system falling below a selected threshold—for example the controller 103 may be configured to operate the system in the third mode in response to the torque demand being zero, or less than zero (i.e. the user wants to slow down). In some examples the controller 103 is configured to operate the system in the third mode in response to a rate of torque demand indicating a deceleration exceeding a selected rate of deceleration threshold.

In some examples in the third mode the controller 103 is configured to operate the system to speed the rotor up from a speed the rotor operates at when the motor is powered by electricity to a flywheel speed for storing energy in the form of kinetic energy. In other words, the controller 103 may be configured to operate the electric motor 101 in a "motor mode" and a "flywheel mode". In the flywheel mode the rotor will spin at much higher speeds (for example, in excess of 20,000 rpm) whereas in the motor mode the rotor will spin at much lower speeds, such as 10,000 rpm or less. In some examples, as shown in FIG. 1, the system comprises a variable transmission 105 such as a continuously or infinitely variable transmission, coupled between the powertrain 107 and the electric motor 101, and wherein the controller 103 being configured to control operation of the motor 101 to operate the system to speed the rotor up comprises the controller 103 being configured to control the operation of the variable transmission 105 to control the supply of energy between the powertrain 107 and the rotor. In this way the controller 103 may use the variable transmission 105 to convert kinetic energy in the powertrain 107 into kinetic energy stored in the rotor. Directly converting mechanical energy in this way may be more efficient than converting the mechanical energy in the powertrain 107 into electrical energy and then using the electrical energy to power a motor to spin up a flywheel, as there are inevitably losses when converting mechanical energy to electrical energy and vice-versa.

The controller 103 may be configured to operate the system in the fourth mode in response to at least one of (i) the speed of the rotor reaching a selected maximum speed threshold and (ii) the determined torque demand remaining below a minimum torque demand threshold for greater than a selected time interval. For example, if the rotor is already spinning at maximum, or close to maximum speed, the controller 103 may be configured to determine that the kinetic energy stored in the rotor should be converted into electrical energy so as to create capacity in the rotor to store more kinetic energy again. The maximum speed threshold may be selected based on design tolerances of the rotor and/or the maximum centripetal force that the rotor can withstand.

In some examples, for example when used in an HEV, the system further comprises an optional battery 111 coupled to the electric motor. In such examples the controller 103 may be configured to operate the system in the fourth mode to control the flow of energy from the electric motor to the battery 111 based on: (i) the state of charge of the battery 111, (ii) the speed of the rotor and optionally (iii) a torque demand required of the electric motor 101. For example, the controller 103 may be configured to only operate in the fourth mode to charge the battery 111 if there is no torque demand placed on the system e.g. if parked or at key-off (when the system is switched off). However it will be understood that this feature is optional as there may be a secondary power source 109 (such as an ICE) which could power the vehicle, so the battery 111 may still be charged even if there is a torque demand so long as the torque demand is met by the secondary power source 109.

In some examples the controller 103 may be configured to operate the system in a fifth mode of operation. In the fifth mode of operation the system may be idle where no energy is being delivered to and/or from the powertrain 107 (for example, the vehicle is on but waiting at traffic lights), for example when there is no determined torque demand and when the rotor is spinning at a speed above a selected threshold. In some examples the fifth mode of operation may comprise auxiliary systems (such as heating, ventilation and air conditioning, HVAC) being powered by kinetic energy stored in the rotor. In some examples, in the fifth mode of operation, if there is another power source (such as secondary power source 109) the controller 103 may be configured to determine whether to power off the other power source to increase efficiency and reduce emissions. It will be understood that the auxiliary systems may also be powered in any of the first, second, third and fourth modes of operation described above by any of the optional battery 111, the secondary power source 109 and/or kinetic energy stored in the rotor of the electric motor 101. In many examples the auxiliary power systems will be powered in first, second, third and fourth modes of operation by the secondary power source 109. The auxiliary power systems may also be powered by the secondary power source 109 in the fifth mode of operation.

Figure 2:
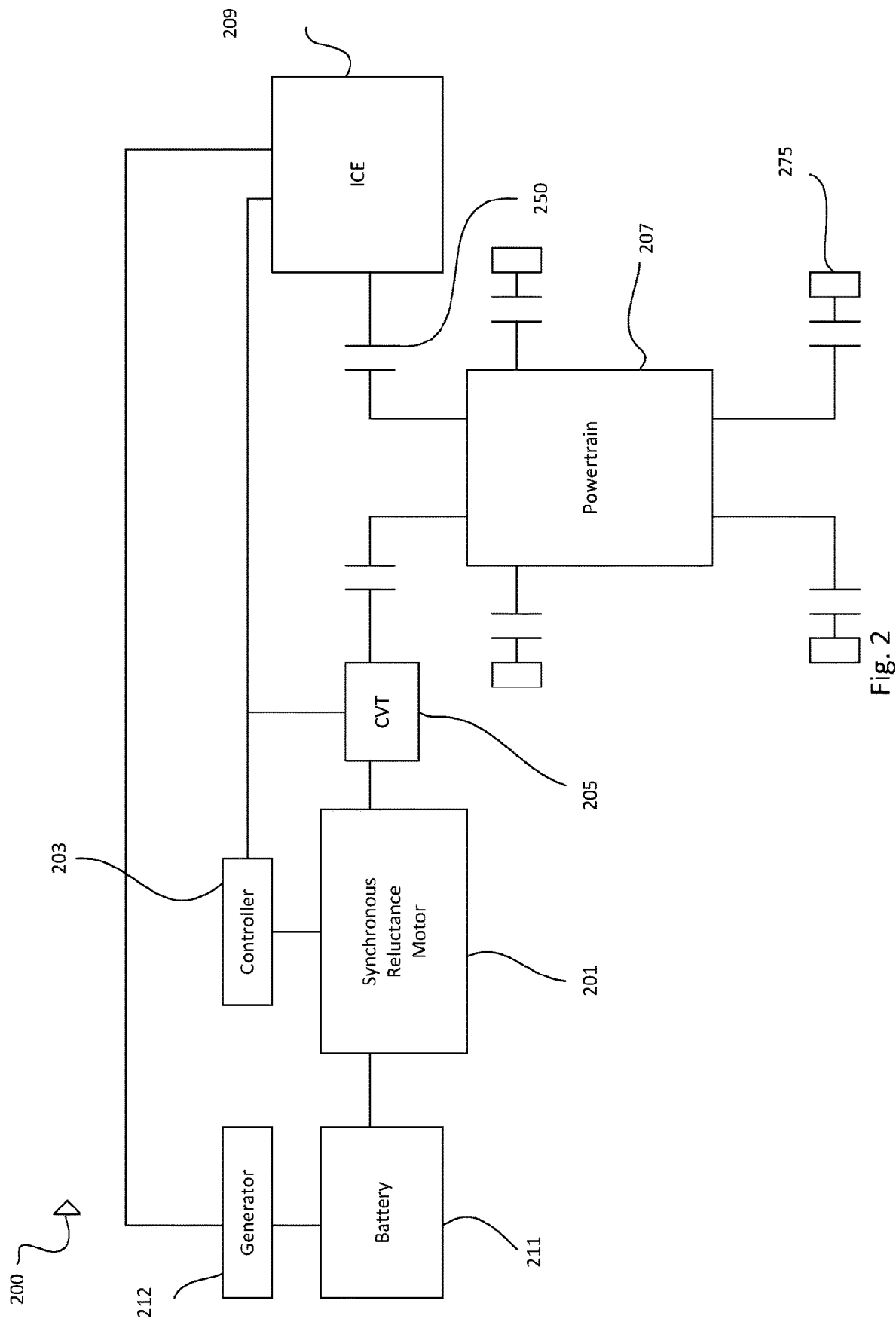
FIG. 2 shows a functional block diagram of another example system for delivering energy to, and storing energy from, an electric or hybrid powertrain.

FIG. 2 shows a functional block diagram of another example system 200 for delivering energy to, and storing energy from, an electric or hybrid powertrain. The system 200 shown in FIG. 2 is in many respects similar to the system 100 shown in FIG. 1, and shares many features and much of the functionality of the system 100 shown in FIG. 1.

As in the system 100 shown in FIG. 1, the system 200 shown in FIG. 2 is a hybrid electric vehicle and comprises a synchronous reluctance electric motor 201 coupled to powertrain 207 via a variable transmission 205. It will be understood that the variable transmission 205 may be one that can change through a range of effective gear ratios, and could include a continuously variable transmission (CVT) and/or an infinitely variable transmission (IVT).

A secondary power source 209, which in this example is an internal combustion engine, is also coupled to the powertrain 207 in parallel to the synchronous reluctance motor 201. It will be appreciated that the secondary power source 209 may also be coupled to the powertrain 207 via a variable transmission (not shown) or may share a variable transmission with the electric motor 201. Between each of the variable transmission 205, and the secondary power source 209 is a clutch 250.

A controller 203 is coupled to the synchronous reluctance electric motor 201, the variable transmission 205 and the secondary power source 209, although it will be understood that the controller 203 may only be coupled to the synchronous reluctance motor 201 and in some examples also the variable transmission 205. In the example shown, the powertrain 207 is a powertrain of a hybrid electric vehicle, and as such the powertrain 107 is coupled to four respective wheels 275. In the example shown each wheel 275 is coupled to the powertrain 207 via a respective optional clutch 250.

In the example shown in FIG. 2 the synchronous reluctance electric motor 201 is also coupled to an optional battery 211, and the battery 211 is coupled to the secondary power source 209 via a generator 212.

The controller 203 shown in FIG. 2 is configured to control operation of the synchronous reluctance electric motor 201 to store energy received from the powertrain 207 in the rotor of the synchronous reluctance electric motor 201 as kinetic energy in much the same way as the controller 103 described above with respect to FIG. 1. The controller 203 is also configured to control operation of the synchronous reluctance electric motor 201 to deliver energy to the powertrain 207 by using kinetic energy stored in the rotor in much the same way as the controller 103 described above with respect to FIG. 1. However, because the system 200 shown in FIG. 2 also comprises a generator between the secondary power source 209 and the battery 211, the secondary power source 209 can be used to charge the battery 211 for powering the electric motor 201.

It will also be understood that although the secondary power source 209 is shown in FIG. 2 as being coupled to the powertrain 207, in some examples the secondary power source 209 may only be coupled to the generator 212 so as to provide power for powering the electric motor 201—in other words in some examples the secondary power source 209 may not directly the powertrain 207 at all but instead may only serve as a source of electrical power for powering the electric motor 201.

Figure 3:
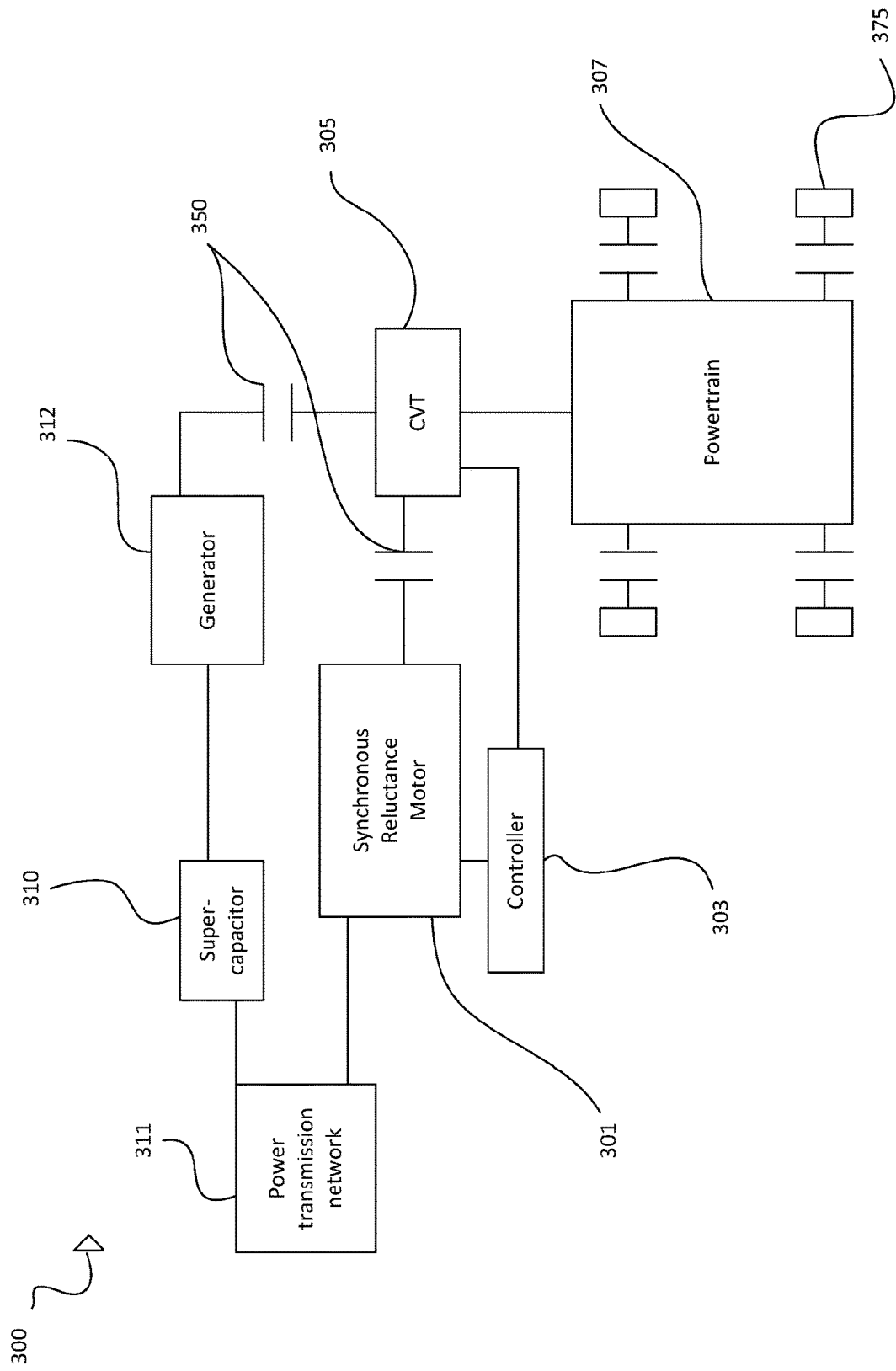
FIG. 3 shows a functional block diagram of another example system for delivering energy to, and storing energy from, an electric or hybrid powertrain.

It will be understood that a secondary power source 109, 209 is optional. FIG. 3 shows a functional block diagram of another example system 300 for delivering energy to, and storing energy from, an electric powertrain that does not include a secondary power source. The system 300 shown in FIG. 32 is in many respects similar to the system 100 shown in FIG. 1 and the system 200 shown in FIG. 2, and shares many features and much of the functionality of the system 100 shown in FIG. 1 and the system 200 shown in FIG. 2.

The system 300 shown in FIG. 3 is an electric vehicle (such as a train or tram) and comprises a synchronous reluctance electric motor 301 coupled to powertrain 307 via a variable transmission 305. It will be understood that the variable transmission 305 may be one that can change through a range of effective gear ratios, and could include a continuously variable transmission (CVT) and/or an infinitely variable transmission (IVT). Between the variable transmission 305 and the electric motor 301 is a clutch 350.

A controller 303 is coupled to the synchronous reluctance electric motor 301 and the variable transmission 305. In the example shown, the powertrain 307 is a powertrain of an electric vehicle, and as such the powertrain 307 is coupled to four respective wheels 375. In the example shown each wheel 375 is coupled to the powertrain 307 via a respective optional clutch 350.

In the example shown in FIG. 3 the synchronous reluctance electric motor 301 is also coupled to a power transmission network 311. In the example shown in FIG. 3 the powertrain 307 is also coupled to a generator 312 in parallel to the electric motor 301 via the variable transmission 305. The generator 312 is coupled to the power transmission network 311 via an optional supercapacitor 310. In this way the powertrain 307 is configured to return energy to the power transmission network 311, for example when the vehicle is braking (also known as "regenerative braking"). The supercapacitor 310 may act to smooth out electricity generated by the system and fed back to the power transmission network 311, which may act to preserve the life of components connected to the power transmission network 311. It will also be understood that the supercapacitor 310 is optional and/or may be replaced by components offering a similar functionality, or may simply not be present at all (for example, the generator 312 may be controlled to regulate its output of electrical energy).

The controller 303 shown in FIG. 3 is configured to control operation of the synchronous reluctance electric motor 301 to store energy received from the powertrain 307 in the rotor of the synchronous reluctance electric motor 301 as kinetic energy in much the same way as the controllers 103, 203 described above with respect to FIGS. 1 and 2. The controller 303 is also configured to control operation of the synchronous reluctance electric motor 301 to deliver energy to the powertrain 307 by using kinetic energy stored in the rotor in much the same way as the controller 103, 203 described above with respect to FIGS. 1 and 2.

Although not shown in FIG. 3, the controller 303 may also be coupled to the generator 312 to control operation of the generator 312, for example to control the supply of electricity generated by the generator 312 for example under regenerative braking conditions.

It will also be understood that although the generator 312 is shown in FIG. 3 in parallel to the synchronous reluctance electric motor 301, the generator and/or supercapacitor 310 may be arranged in series with the electric motor 301 (for example, between the power transmission network 311 and the electric motor 301). It will also be understood that in other examples the generator 312 may be entirely optional and may not be present—in such examples the electric motor 301 itself may be configured to operate as a generator by converting kinetic energy in the rotor into electrical energy.

Figure 5:
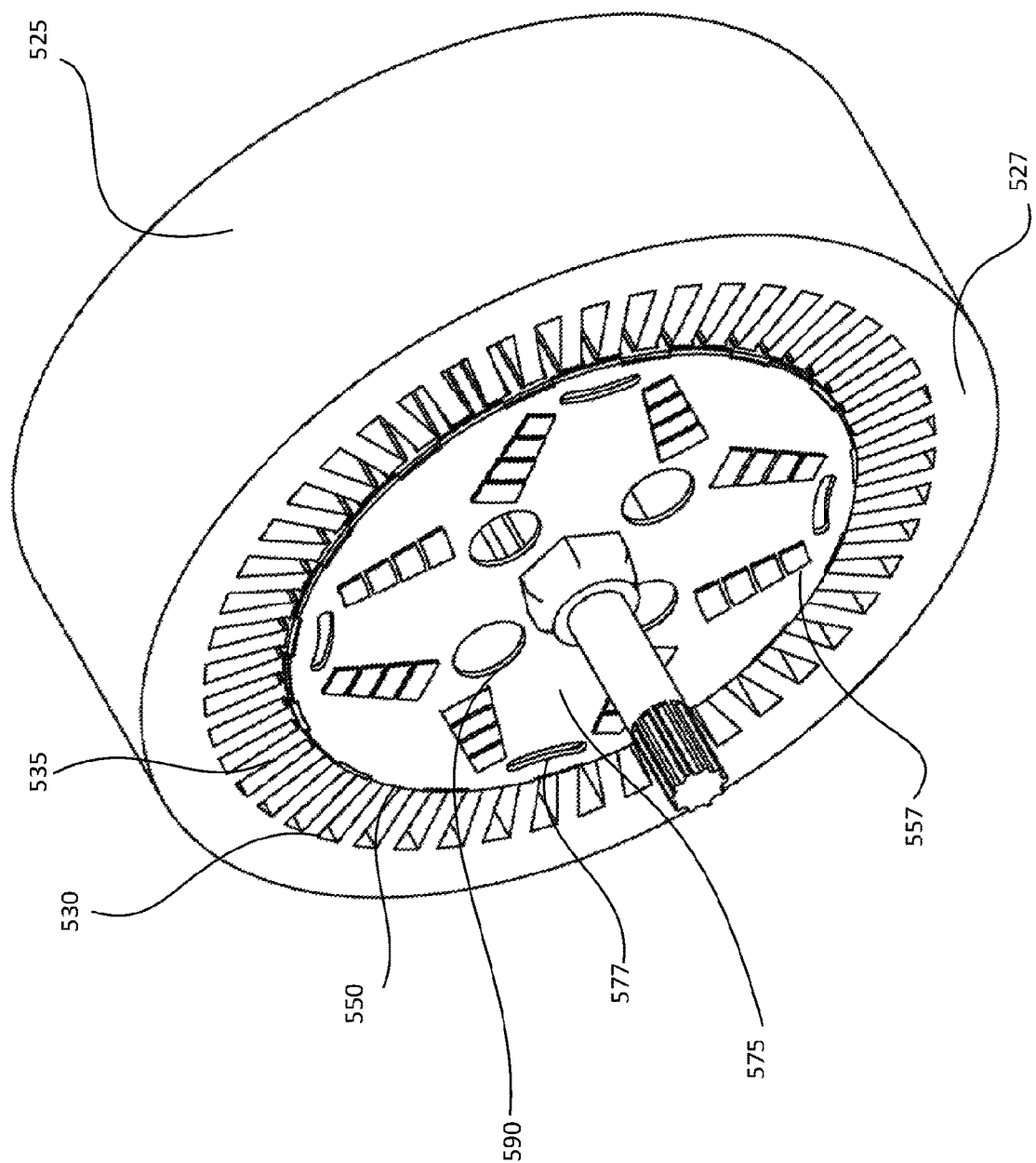
FIG. 5 shows a perspective view of an example synchronous reluctance electric motor.
Figure 6:
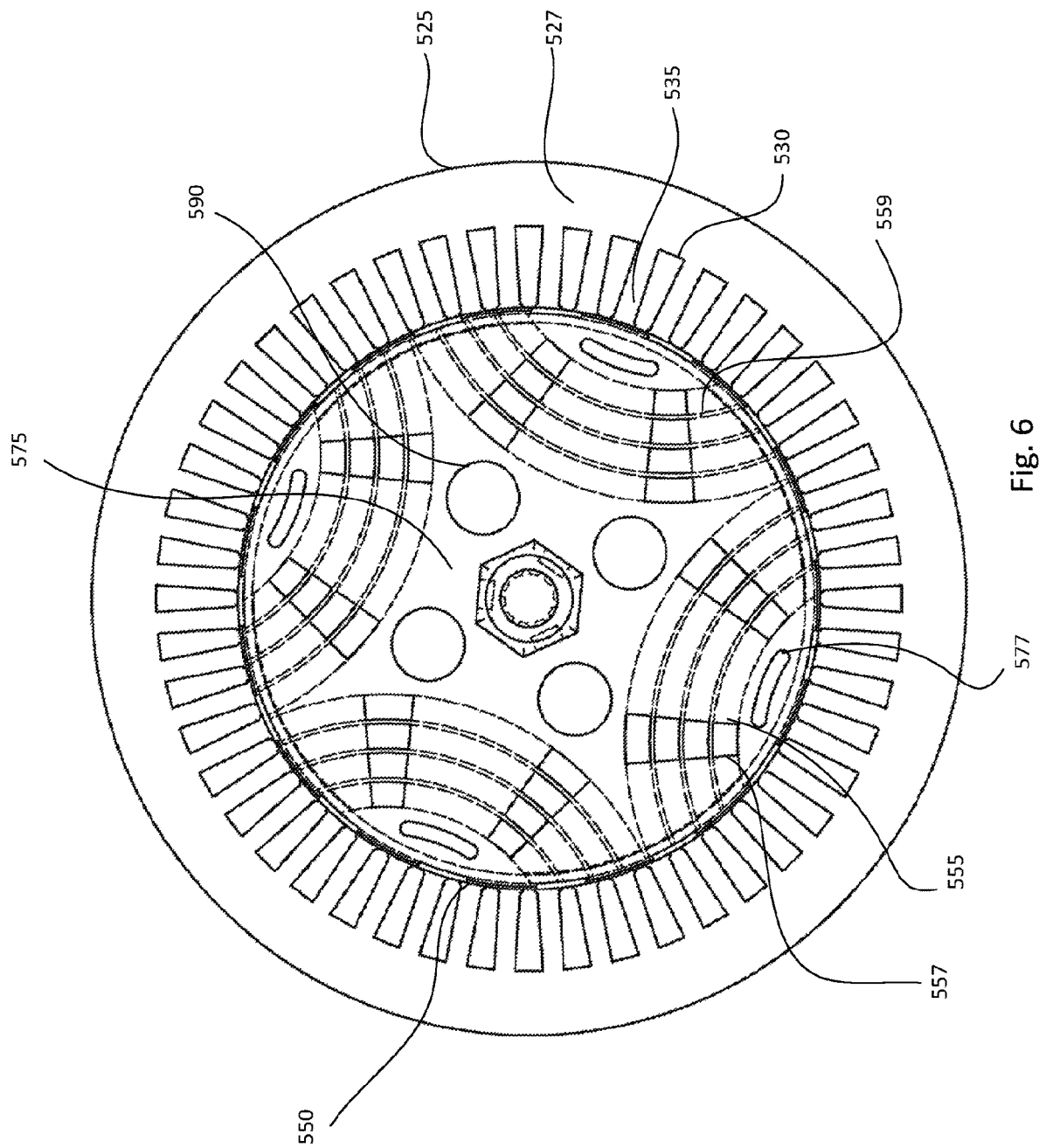
FIG. 6 shows an end view of the example synchronous reluctance electric motor of FIG. 5.
Figure 7:
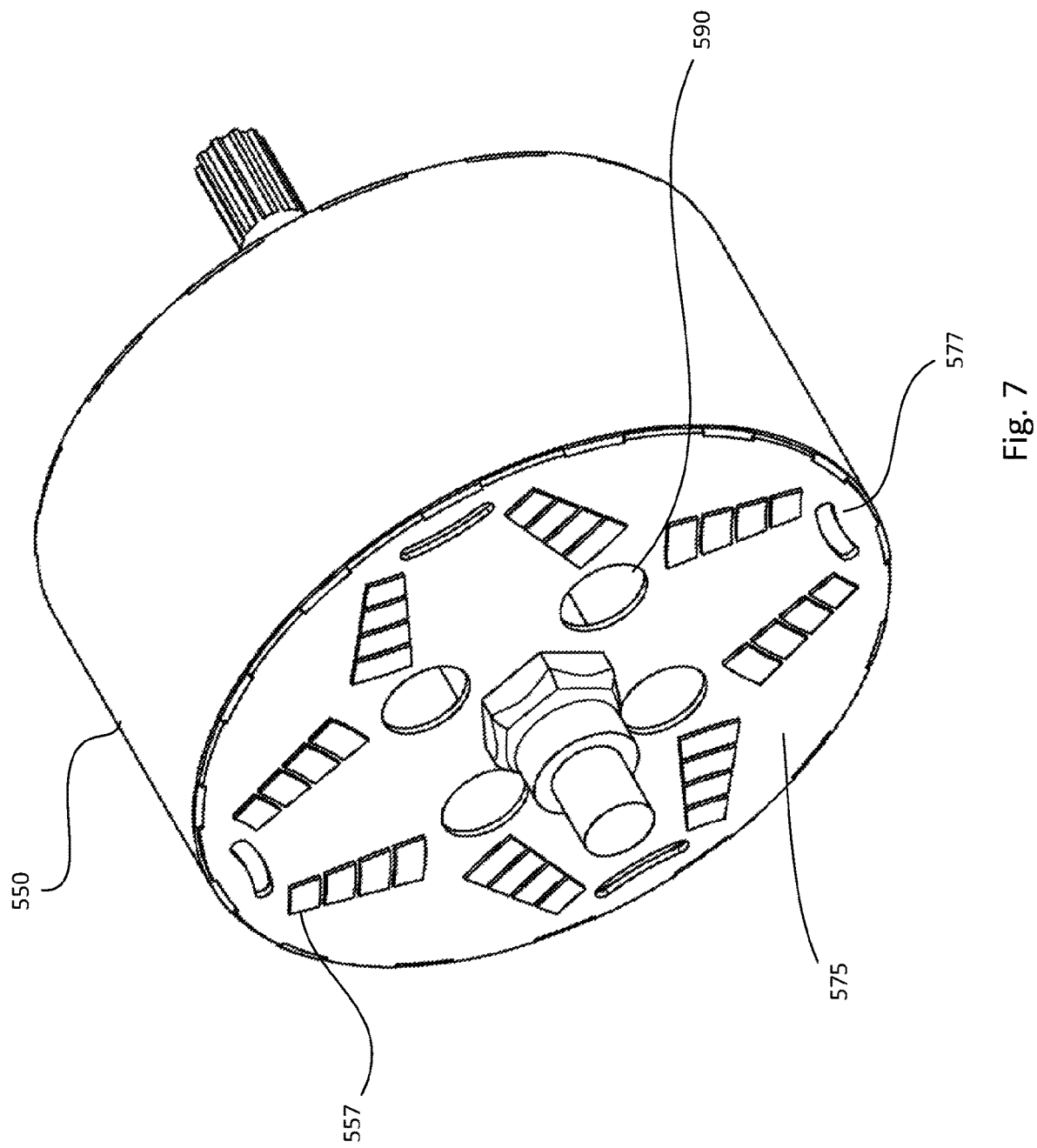
FIG. 7 shows a perspective of an the rotor of the example synchronous reluctance electric motor of FIG. 5.

FIGS. 5 to 7 show different views of an example of an example synchronous reluctance electric motor, such as the synchronous reluctance electric motor 101, 201 and 301 shown in FIGS. 1 to 3.

As shown in FIGS. 5 to 7 the synchronous reluctance electric motor comprises a stator 525 and a rotor 550. The rotor 550 is coaxial with and inside the stator 525. Because the rotor 550 is for a synchronous reluctance electric motor it does not contain any permanent magnets. The rotor 500 comprises a circular housing 575 containing a plurality of magnetic flux guides 555, each supported by respective flux guide supports 557. In the examples shown, the rotor 550 is bounded by an outer ring of non-magnetic material forming part of the housing 575. In some examples the outer ring has a relative permeability of 1. In the example shown each flux guide 555 is 8.5 mm thick and the spacing between each flux guide 555 is 1.5 mm.

The stator 525 comprises a plurality of teeth 535 around which aluminium windings are formed, although in other examples the windings may use a different material—for example copper windings may be used. The aluminium windings of the stator 525 may be joined via a weld, for example with a bimetallic joint. The windings may be configured to handle a peak current of 10 A and excited by a three phase AC current. Each tooth 535 is tapered such that a portion of the tooth 535 closer to the rotor 500 is narrower than a portion of the tooth 535 further away from the rotor 550. In the examples shown, the teeth 535 of the stator form at least 36 slots 530, and may form at least 48 slots 530. Each tooth 535 of the stator 525 comprises only one layer of windings and may comprise at least 8 turns in each winding on each tooth 535. The depth of the slots 530 in the stator 525 are selected such that the "back iron" depth 527 between the bottom of each slot 530 and the outer periphery of the stator 525 facing away from the rotor 550 is relatively small, for example less than the depth of each of the slots 530. In the examples shown each slot 530 is at least 23 mm deep (for example 27 mm deep) and at least 4 mm wide (for example at least 8 mm wide). The stator 525 internal diameter is 200 mm, and the stator 525 external diameter is 300 mm. The rotor 550 outer diameter is 198 mm, and internal diameter is 50 mm. The air gap between the rotor 550 and stator 525 is therefore 2 mm.

The plurality of magnetic flux guides 535 comprise a plurality of at least partially nested flux guides 535 formed from layers of magnetic material layered in a radial direction. In the examples shown, the layers of magnetic material forming the flux guides 555 are coupled together to form discrete, laminated, packets of flux guides 555, with each discrete packet configured, in use, to provide a pole in the rotor 550. The packets are spaced around the periphery of the housing 575 of the rotor 550, and wherein the centre of the rotor 550 is filled with aluminium.

The layers of magnetic material forming the flux guides 555 are separated by a non-magnetic material, for example a non-magnetic composite material, which may be at least one of an aluminium alloy, a glass composite such as M19_24G, a polyester resin such as Mylar®, aramid polymers with aromatic backbones such as Nomex®, ceramics and/or a resin epoxy. Each of the flux guides 555 are arcuate with the mid-point of each flux guide 555 being closest to the centre of the rotor 550 and the ends of each flux guide 555 being closest to the edge of the rotor 550 in the radial direction.

The plurality of magnetic flux guides 555 are configured to preferentially guide the flow of magnetic flux therethrough. In the examples shown the flux guides 555 are configured to provide at least four poles in the rotor 550.

The rotor 550 is configured, in use, to be operated hot—for example at temperatures of at least 300° C., for example at least 400° C. In some examples the stator 525 may be configured, in use, to be operated hot—for example at temperatures higher than that of the rotor 550, for example at temperatures of at least 480° C. The rotor 550 is also configured to be operated as a flywheel to store kinetic energy—for example, the rotor 550 is configured to be spun at speeds of at least 40,000 rpm when operated as a flywheel to store kinetic energy.

In some examples at least a portion of each flux guide 535 proximate to the periphery of the rotor 550 (for example, proximate to the outer ring) is formed from a different material to the rest of the flux guide 555, for example a soft magnetic composite such as Somaloy® 500 or Somaloy® 700.

In some examples the synchronous reluctance electric motor further comprises a cooling means surrounding the stator 525. The cooling means may comprise a liquid-filled jacket.

In some examples the synchronous reluctance electric motor further comprises a layer of aluminium sandwiching either side of the rotor 550 and stator 525 along the axis of rotation of the rotor 550, wherein the layers of aluminium are configured to provide a squirrel cage for the motor.

The housing 575 for the rotor 550 may be configured to act as a cast for use in manufacturing the rotor 550. As such the cast 575 for receiving components of the rotor 550 also comprises the outer ring configured to encircle the rotor 550 arounds its circumference and wherein the ring is configured to hold the components of the rotor 550 therewithin. The cast 575 comprises a plurality of receiving portions 557 configured to receive and position the flux guides 555 within the rotor 550. The cast 575 also comprises a series of inner holes 590 and outer holes 577 for receiving material for forming the rotor 550. In the example shown there are four inner holes 590 spaced around a central axis of the rotor 550 and arranged inside of each of the packets of flux guides 55, although it will be understood that there may be more or less holes and that they need not be circular. The outer holes 577 are arranged to be outside of the packets of flux guides 555 but inside the periphery of the housing 575.

Figure 8:
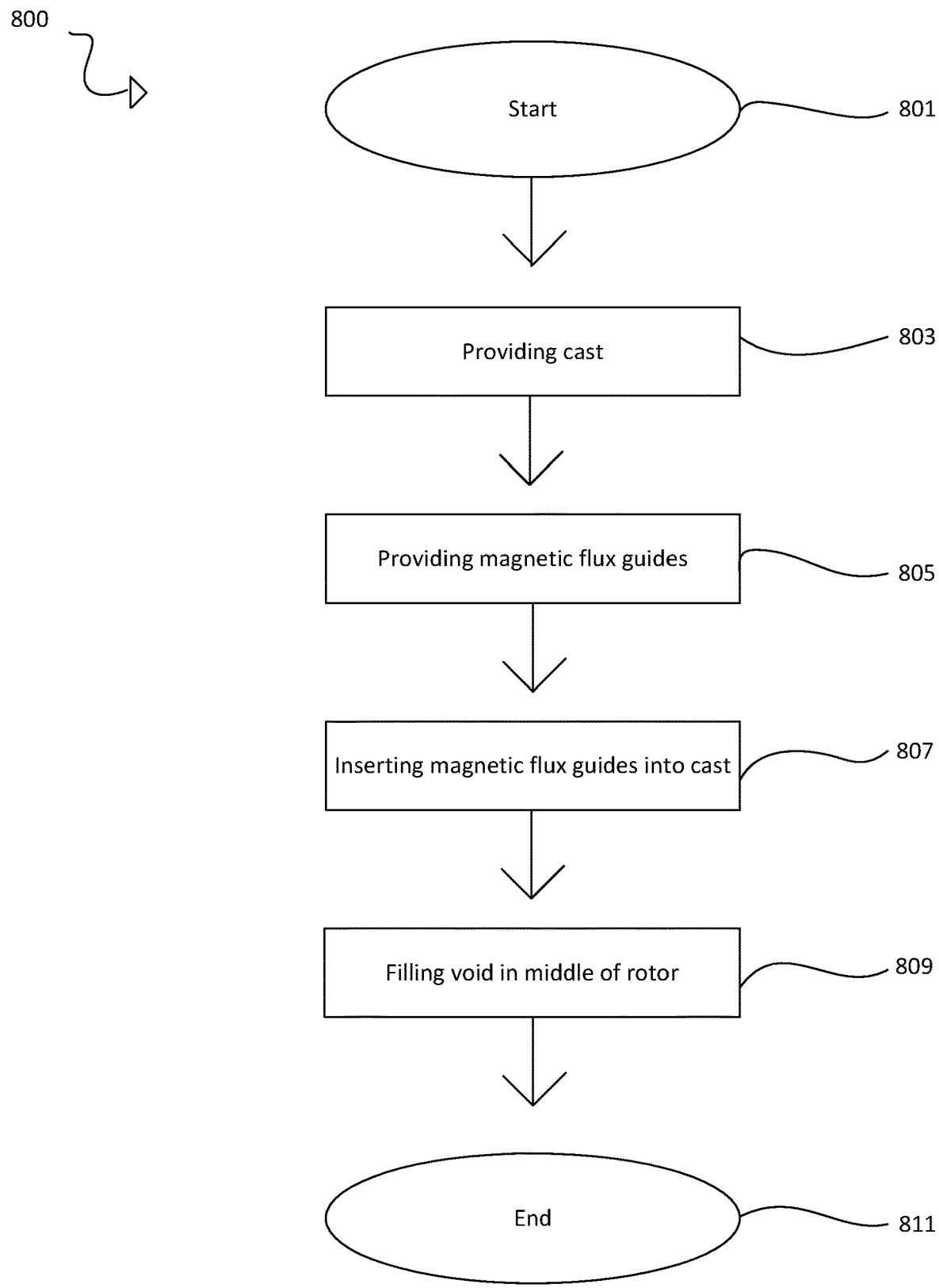
FIG. 8 shows a flow chart of an example method of manufacturing a rotor for a synchronous reluctance electric motor, such as the rotor shown in FIG. 6.

An example method of manufacture 800 of a rotor 550 for a synchronous reluctance motor, such as the rotor 550 shown in FIGS. 5 to 7, is shown in FIG. 8 and comprises the steps of: providing 803 a cast 575 for receiving components of the rotor; providing 805 a plurality of magnetic flux guides 555 configured to preferentially guide the flow of magnetic flux therethrough; inserting 807 the plurality of magnetic flux guides 555 in groups inside the cast 575, wherein the groups are spread in a circular pattern around the cast 575, thereby creating a void in the middle of the rotor 550; and filling 809 the void in the middle of the rotor 550 with a non-magnetic material. In some examples once the rotor has been manufactured, the cast 575 may be removed, but in other examples the cast 575 may remain in place. In some examples the cast 575 may comprise portions made from different materials—for example magnetic and not magnetic materials. For example, the portion of the cast 575 forming the outer ring may be made from a non-magnetic material, whereas made from a magnetic material. In some examples, the portions of the cast 575 forming either end (in an axial direction) of the rotor 550 may be configured to act as a squirrel cage.

Filling 809 the void in the middle of the rotor 550 may comprise pouring or injecting a material (such as molten aluminium) into the housing 575 of the rotor 550 through the inner holes 590. In addition, in some examples material may also be poured or injected into the outer holes 577 to fill a void between a packet of flux guides 555 and the periphery of the rotor 550 which may be bounded by the outer ring of the housing 575. Filling this void between each packet of flux guides 555 and the periphery of the rotor 550 may help to increase the structural integrity of the rotor 550, particularly if it is to be used to store kinetic energy like a flywheel.

Figure 9:
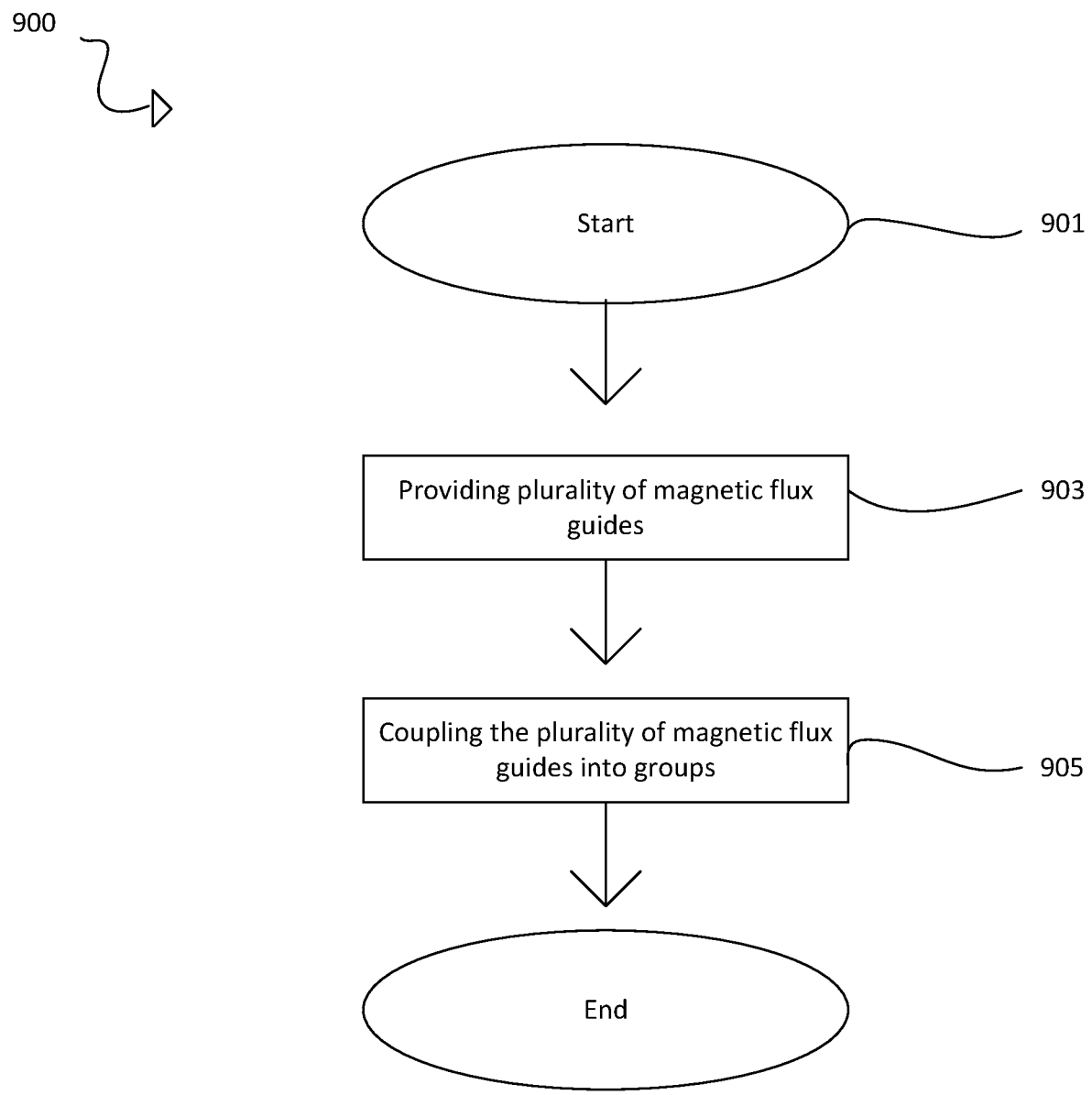
FIG. 9 shows a flow chart of another example method of manufacturing a rotor for a synchronous reluctance electric motor, such as the rotor shown in FIG. 6.

As shown in FIG. 9, another example method of manufacture 900 of a rotor 550 for a synchronous reluctance motor comprises the steps of: providing 903 a plurality of magnetic flux guides 555 configured to preferentially guide the flow of magnetic flux therethrough; and coupling 905 the plurality of magnetic flux guides 555 into groups, each with a respective flux guide support 557, wherein the groups are configured to be spread around the periphery of the inside of the rotor 550.

Coupling the plurality of flux guides 555 into groups with the flux guide support 557 may comprise creating sandwiched layers of flux guides supports 557, wherein the sandwiched layers comprise layers of non-magnetic composite sandwiched between layers of magnetic flux guide 555. Additionally or alternatively coupling the plurality of flux guides 555 into groups with the flux guide supports 557 comprises coupling layers of flux guides 555 together to form a plurality of discrete packets of magnetic flux guides 555, wherein each packet comprises a plurality of layers of magnetic flux guides 555. In some examples coupling layers of flux guides 555 together comprises fastening layers of flux guides 555 together with a fastening means that passes at least partially through the layers of flux guides 555 to fasten the layers of flux guides 555 together. For example the fastening means may be a bolt or rivet.

Figure 10:
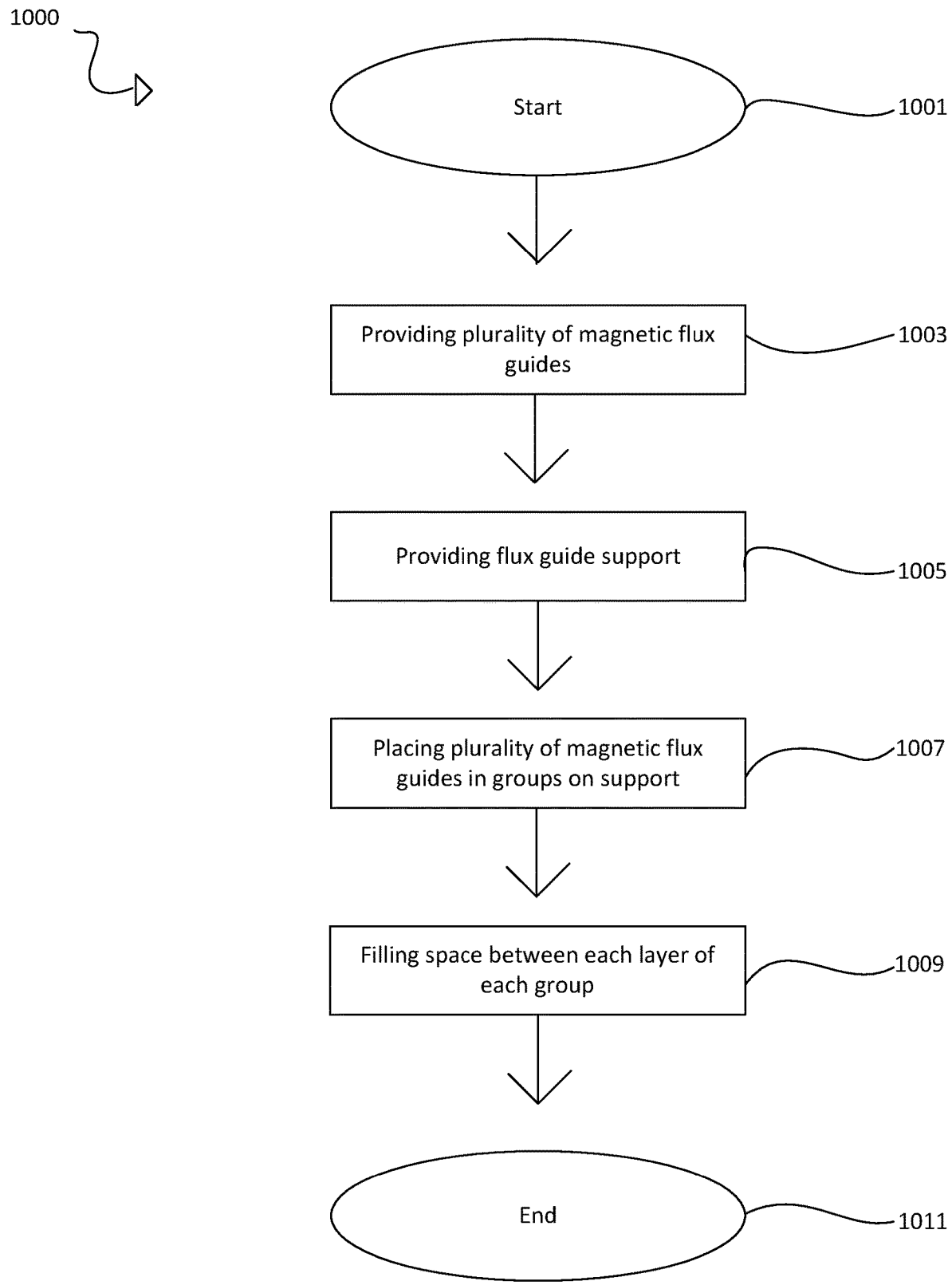
FIG. 10 shows a flow chart of another example method of manufacturing a rotor for a synchronous reluctance electric motor, such as the rotor shown in FIG. 6.

As shown in FIG. 10, another example method of manufacture 1000 of a rotor for a synchronous reluctance motor comprises the steps of: providing 1003 a plurality of magnetic flux guides 555 configured to preferentially guide the flow of magnetic flux therethrough; providing 1005 a flux guide support 557 for supporting the plurality of magnetic flux guides 555; placing 1007 the plurality of magnetic flux guides 555 in groups on the magnetic flux guide support 557, wherein each group comprises a plurality of layered magnetic flux guides 555 forming a packet of magnetic flux guides 555; and filling 1009 the space between each layer of each group forming a packet with a non-magnetic composite material to form sandwiched layers of non-magnetic composite sandwiched between layers of magnetic flux guide 555.

In some example placing the plurality of magnetic flux guides 555 in groups, each group forming a packet, on the magnetic flux guide support 557 comprises placing the packets of magnetic flux guides 555 in a circular pattern around the support 557, further comprising coupling the magnetic flux guides 555 of each packet together by filling a void between each packet of magnetic flux guides 555 with a non-magnetic material (for example aluminium and/or a glass composite).

Figure 11:
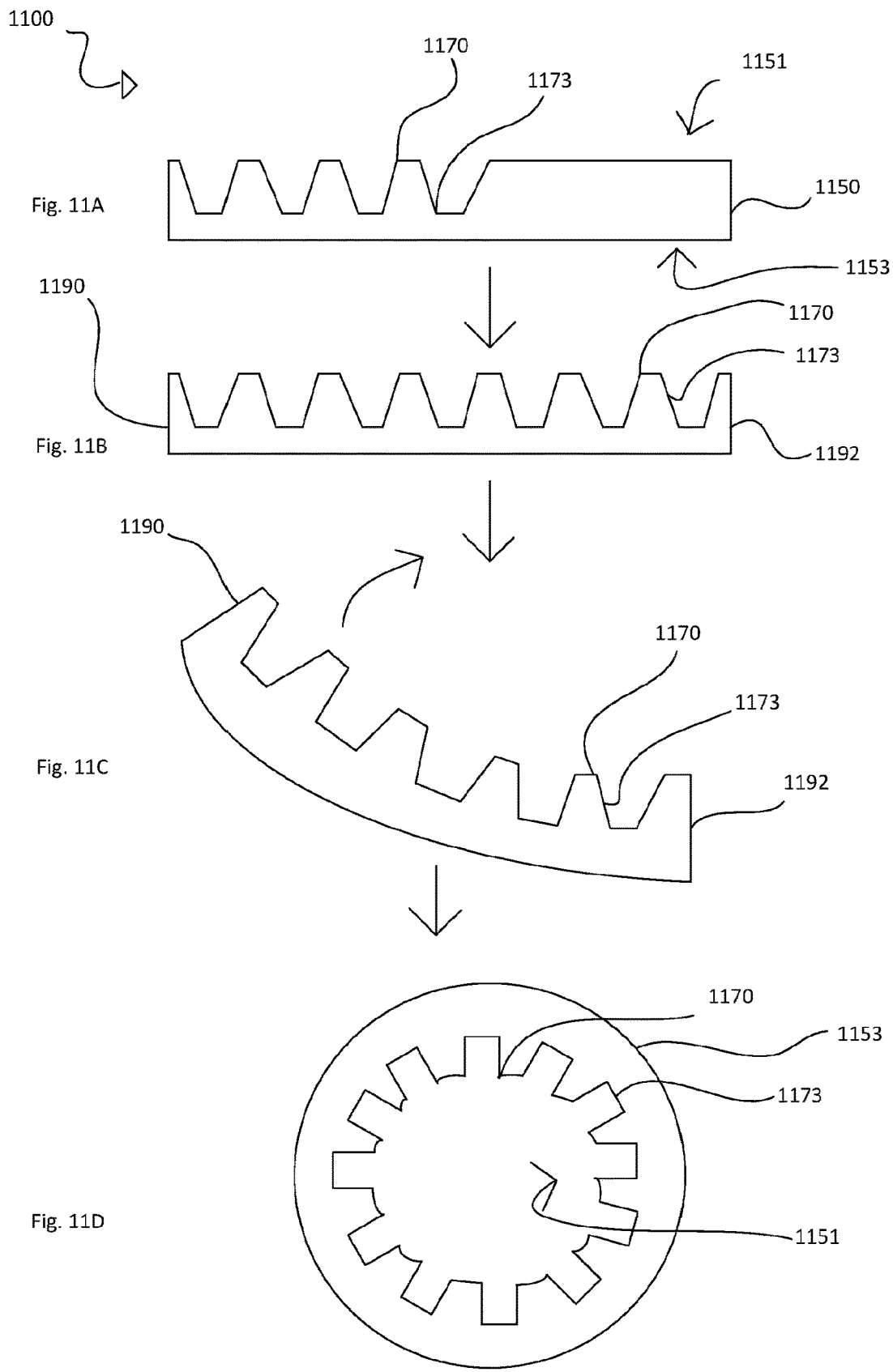
FIGS. 11A to 11D show a series of steps involved in manufacturing a stator for a synchronous reluctance electric motor, such as the stator shown in FIG. 6.

An example method of manufacture of a stator 525 for a synchronous reluctance motor is shown in FIGS. 11A to 11D. The method comprises the steps of: providing an elongate strip 1151 of magnetic material (as shown in FIG. 11A), forming a plurality of slots 1173 along one edge 1151 of the elongate strip 1150 (as shown in FIGS. 11A and 11B this is along an upper edge 1151 of the elongate strip 1150), thereby forming a plurality of stator teeth 1173 for receiving stator windings along the edge 1151 of the elongate strip 1150, wherein the depth of the slots 1173 are selected such that the depth of material of the elongate strip 1150 between the bottom of each slot 1173 and an opposing edge 1153 of the elongate strip 1150 is sufficient to allow the elongate strip 1150 to bend sufficiently such that two ends of the elongate strip 1150 may be joined together; and connecting two opposing ends 1190, 1192 of the elongate strip 1150 together into a ring such that the edge 1151 of the elongate strip comprising the plurality of slots 1173 face towards the inside of the ring (as shown in FIGS. 11C and 11D).

Forming the plurality of slots 1173 may comprise forming a plurality of tapered slots 1173 to thereby form a plurality of tapered teeth 1170. The degree of tapering may be selected based on the length of the elongate strip 1150 such that when the two opposing ends 1190, 1192 of the elongate strip 1150 are connected together into a ring the spacing between the plurality of the tapered teeth 1170 along a depth of the slot 1173 is uniform.

The rotor 550, or any component thereof (such as the flux guides 555 or flux guide supports 557), may be manufactured by subtractive or additive processes. For example, the flux guide supports 557 as shown in FIGS. 5 to 7 may be manufactured using 3D printing for example using a PLA thermoplastic material. The rotor 550, or any component thereof, may also be manufactured by assembling pre-manufactured components together such as by adhering a sheetlike element to a substrate. This may be done by laying down a preformed track of the material, or by laying down a larger sheet and then etching it away. This sheetlike element may be grown or deposited as a layer on the substrate. If it is deposited a mask may be used so the deposition happens only on regions which are to carry the track and/or it may be allowed to take place over a larger area and then selectively etched away.

Other methods of manufacture may also be used. For example, the rotor 550 or any component thereof may be manufactured by way of '3D printing' whereby a three-dimensional model of the rotor 550, or any component thereof, are supplied, in machine readable form, to a '3D printer' adapted to manufacture rotor 550 or any component thereof. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the rotor 550 or any component thereof may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

In the context of the present disclosure other examples and variations of the apparatus and methods described herein will be apparent to a person of skill in the art. It will be appreciated from the discussion above that the embodiments shown in the Figures are merely exemplary, and include features which may be generalised, removed or replaced as described herein and as set out in the claims. It will also be appreciated that methods described herein, such as methods of operating a controller 103, 203, 303 as described above with respect to FIGS. 1 to 3, or methods of manufacture, as described above and with reference to FIGS. 8 to 11D, may be provided on a computer readable non-transitory storage medium, for example in the form of a program for a computer configured to cause a processor to perform the method.

The invention claimed is:

1. A system for delivering energy to, and storing energy from, an electric or hybrid powertrain, the system comprising:
   a synchronous reluctance electric motor couplable to the powertrain; and
   a controller configured to control operation of the synchronous reluctance electric motor to store energy received from the powertrain in a rotor of the synchronous reluctance electric motor as kinetic energy.

2. The system of claim 1 wherein the controller is configured to control operation of the synchronous reluctance electric motor to deliver energy to the powertrain by using kinetic energy stored in the rotor, wherein the controller is configured to determine a torque demand required of the system and control operation of the motor to deliver energy to the powertrain using kinetic energy stored in the rotor in response to the determined torque demand reaching a selected torque demand threshold.

3. The system of claim 2 wherein the controller is configured to determine a rate of change of torque demand required of the system and control operation of the motor to deliver energy to the powertrain using one of:
   (i) kinetic energy stored in the rotor; or
   (ii) electricity powering the synchronous reluctance electric motor;
   in response to the determined rate of change of torque demand reaching a selected rate of change of torque demand threshold.

4. The system of claim 2 wherein the controller is configured to determine a torque demand required of the system and control operation of the motor to store kinetic energy in the rotor of the electric motor from the powertrain in response to the torque demand falling below a selected torque demand threshold.

5. The system of claim 1 wherein the controller is configured to determine, based on a speed of rotation of the rotor and/or a determined torque demand of the system, whether to operate the system in at least one of:

(i) a first mode of operation operable to deliver energy to the powertrain by powering the motor via electricity;
(ii) a second mode of operation operable to deliver energy to the powertrain by using kinetic energy stored in the rotor; and
(iii) a third mode of operation operable to store energy received from the powertrain as kinetic energy; and
(iv) a fourth mode of operation operable to convert kinetic energy in the rotor to electrical energy.

6. The system of claim 5 wherein the controller is configured to operate the system in the fourth mode in response to at least one of (i) the speed of the rotor reaching a selected maximum speed threshold and (ii) the determined torque demand remaining below a minimum torque demand threshold for greater than a selected time interval, wherein the system further comprises a battery coupled to the electric motor, wherein the controller is configured to operate the system in the fourth mode to control the flow of energy from the electric motor to the battery based on: (i) the state of charge of the battery, (ii) the speed of the rotor and optionally (iii) a torque demand required of the electric motor.

7. The system of claim 5 wherein the controller is configured to operate the system in the first mode when the speed of the rotor is below a selected rotor speed threshold, wherein the controller is configured to operate the system in the second mode when the speed of the rotor is above a selected rotor speed threshold.

8. The system of claim 5 wherein the controller is configured to operate the system in the first mode in response to the determined torque demand reaching or exceeding a selected torque demand threshold, and in the second mode in response to the determined torque demand falling below a selected torque demand threshold, wherein the controller is configured to operate the system in the third mode in response to a torque demand of the system falling below a selected threshold.

9. The system of claim 5 wherein the controller is configured to operate the system in the third mode in response to a rate of torque demand indicating a deceleration exceeding a selected rate of deceleration threshold, wherein in the third mode the controller is configured to operate the system to speed the rotor up from a speed the rotor operates at when the motor is powered by electricity to a flywheel speed for storing energy in the form of kinetic energy.

10. A method of operating an electric or hybrid system comprising a synchronous reluctance electric motor coupled to an electric or hybrid powertrain, the method comprising:
    determining (i) a torque demand required of the electric motor and (ii) a speed of rotation of a rotor of the electric motor;
    storing kinetic energy in the rotor of the electric motor from the powertrain in response to at least one of (i) the determined torque demand falling below a selected torque demand threshold and (ii) the speed of the rotor being below a selected rotor speed threshold; and
    operating the electric motor by powering the electric motor with electricity to deliver energy to the powertrain in response to at least one of: (i) the determined torque demand rising above a selected torque demand threshold and (ii) the speed of the rotor falling below a selected rotor speed threshold.

11. The method of claim 10 further comprising powering the electric motor with electricity to deliver energy to the powertrain in response to both (i) the torque demand rising above a selected torque demand threshold, and (ii) the speed of the rotor of the electric motor falling below a selected rotor speed threshold.

12. The method of claim 10 further comprising:
operating the system to deliver energy to the powertrain by using kinetic energy stored in the rotor when the speed of the rotor is above a selected speed threshold.

13. The method of claim 10 further comprising:
operating the system to convert kinetic energy in the rotor to electrical energy in response to at least one of (i) the speed of the rotor reaching a selected maximum speed threshold and (ii) the determined torque demand remaining below a selected minimum torque demand threshold for greater than a selected time interval.

14. The method of claim 10 further comprising determining a rate of change of torque demand required of the system and controlling operation of the motor to deliver energy to the powertrain using one of:
(i) kinetic energy stored in the rotor; or
(ii) electricity powering the synchronous reluctance electric motor;
in response to the determined rate of change of torque demand reaching a selected rate of change of torque demand threshold.

15. A computer readable non-transitory storage medium comprising a program for a computer configured to cause a processor to perform the method of claim 10.

16. A rotor for a synchronous reluctance electric motor comprising no permanent magnets and a plurality of magnetic flux guides supported by a flux guide support, wherein the plurality of magnetic flux guides are configured to preferentially guide the flow of magnetic flux therethrough.

17. The rotor of claim 16 wherein the plurality of magnetic flux guides comprise a plurality of at least partially nested flux guides formed from layers of magnetic material layered in a radial direction.

18. The rotor of claim 17 wherein the layers of magnetic material forming the flux guides are coupled together to form discrete, laminated, packets of flux guides, with each discrete packet configured, in use, to provide a pole in the rotor, wherein the packets are spaced around the periphery of the rotor, and wherein the centre of the rotor is filled with aluminium.

19. The rotor of claim 17 wherein the layers of magnetic material forming the flux guides are separated by a non-magnetic composite material, wherein the flux guides are configured to provide at least four poles in the rotor, wherein each of the flux guides are arcuate with the mid-point of each flux guide being closest to the centre of the rotor and the ends of each flux guide being closest to the edge of the rotor in the radial direction, wherein the rotor is bounded by an outer ring of non-magnetic material.

* * * * *